United States Patent [19]
Kamiko

[11] Patent Number: 5,991,467
[45] Date of Patent: Nov. 23, 1999

[54] IMAGE READING APPARATUS CONTAINING LIGHT RECEIVING TRANSISTORS AND SWITCHING TRANSISTORS

[75] Inventor: Mitsuo Kamiko, Miyagi-ken, Japan

[73] Assignee: Alps Electric Co., Ltd., Tokyo, Japan

[21] Appl. No.: 08/891,130

[22] Filed: Jul. 10, 1997

[30] Foreign Application Priority Data

Jul. 18, 1996 [JP] Japan .................................. 8-189792

[51] Int. Cl.[6] .............................. G06K 7/00; H01J 40/14
[52] U.S. Cl. .................... 382/312; 382/124; 250/208.1; 250/214 B
[58] Field of Search .................................. 382/312, 313, 382/100, 124, 125, 126, 127; 250/214 AL, 556, 214 B, 214 SW, 208.1; 356/71

[56] References Cited

U.S. PATENT DOCUMENTS

| | | | |
|---|---|---|---|
| 3,993,888 | 11/1976 | Fellman | 382/124 |
| 4,353,056 | 10/1982 | Tsikos | 340/146.3 B |
| 4,577,345 | 3/1986 | Abramov | 382/312 |
| 5,162,644 | 11/1992 | Nagata et al. | 250/208.1 |
| 5,177,802 | 1/1993 | Fujimoto et al. | 382/124 |
| 5,325,442 | 6/1994 | Knapp | 382/312 |
| 5,446,290 | 8/1995 | Fujieda et al. | 250/556 |
| 5,621,516 | 4/1997 | Shinzaki et al. | 382/124 |
| 5,778,089 | 7/1998 | Borza | 382/124 |

OTHER PUBLICATIONS

"Two–Dimensional Contact–Type Image Sensor Using Amorphous Silicon Photo–Transistor," Muneaki Yamaguchi, et al, *Japan J. Appl Phys.*, vol. 32 (1993) pp. 458 and 460.

"Amorphous Silicon Two Dimensional Image Sensor Arrays," R.A. Street, X.D. Wu, et al. Xerox Palo Alto Research Center, Palo Alto, Ca. 94304, USA, pp. 96–99.

*Primary Examiner*—Matthew C. Bella
*Attorney, Agent, or Firm*—Brinks Hofer Gilson & Lione

[57] ABSTRACT

An inexpensive, miniaturized and thin image reading apparatus reads various types of images, such as fingerprints. The apparatus includes a transparent substrate. A light-emitting unit emits light to pass through the transparent substrate and to be applied to a subject pressed against the substrate. A plurality of light-receiving units are disposed on the substrate in the vertical and horizontal directions with intervals therebetween and receive the light which is emitted from the light-emitting unit and is reflected from the subject. A reading device reads an image of the subject in accordance with the amount of light received by the light-receiving units.

12 Claims, 23 Drawing Sheets

IRRADIATING
LIGHT

IMAGE READING APPARATUS CONTAINING LIGHT RECEIVING TRANSISTORS AND SWITCHING TRANSISTORS

BACKGROUND OF THE INVENTION

1. Field of the Invention

The present invention relates to an apparatus for reading images of various subjects, for example, fingerprints, documents, patterns, etc.

2. Description of the Related Art

Fingerprints have long been used as means for identifying individuals, and a great amount of research and development on automated fingerprint identification systems is being made. As society becomes more and more information-oriented, there is an increasing demand particularly for security in respect of the identifications of individuals who attempt to enter or exit important administration areas, such as computer rooms, or to access various information terminals and banking terminals.

A variety of fingerprint readers used for the above kind of identifications of individuals, which instantaneously detect high-contrast images formed in accordance with the irregularities of the fingerprint patterns, have been developed.

As an example of the fingerprint readers, the one shown in FIG. 32, which is operable according to the total reflection method, is known. This fingerprint reader is constructed of a light-emitting unit 10, a lens 11, a rectangular prism 12, and a CCD camera 13. In operation, total reflection occurs to a beam emitted from the light-emitting unit 10 on the slanted surface of the rectangular prism 12, and the light reflected from the prism 12 is then received by the CCD camera 13. When a finger 14 is placed on the slanted surface of the prism 12, total reflection is caused on the slanted surface corresponding to depressions 15 of the fingerprint, which are not in contact with the slanted surface, and incident on the CCD camera 13, while irregular reflection rather than total reflection occurs on ridges of the fingerprint in contact with the slanted surface of the prism 12 due to a disparity in the refractive index between the finger 14 and air. Thus, the contrast of the totally reflected light and the scattered light is detected by the CCD camera 13, thereby obtaining a high-contrast fingerprint image.

In addition to the above total-reflection method, the optical-path separation method and the photoconductive method using a glass conductive plate are known.

However, the above-described methods require a rectangular prism and a lens, thereby making it difficult to reduce the size of the overall fingerprint reader. What is worse, these prism and lens are expensive, thus increasing the cost. Further, scattered light from the ridges of a fingerprint, as well as totally reflected light from the depressions 15, inconveniently impinges on the CCD camera 13, which makes it hard to clearly distinguish the ridges from the depressions 15 of the fingerprint, resulting in a low-contrast image.

To overcome the aforedescribed problems inherent in a conventional reader, a fingerprint reader using a fiber optic plate (FOP) 19 formed by a bundle of a numerous optic fibers, as illustrated in FIG. 33, has been developed. This fingerprint reader is constructed of a light-emitting unit 18 formed of a light emitting diode, a fiber optic plate 19, and a CCD 20 intimately contacting the output surface of the FOP 19. In this reader, as illustrated in FIG. 34, total reflection occurs to the light emitted from the light-emitting unit 18, and a light pattern representing a fingerprint image is formed according to the irregularities of the fingerprint pattern. The light pattern is then directly transmitted to the CCD 20 via the FOP 19.

Since a lens is not employed for the above fingerprint reader using a fiber optic plate, a space originally required for image formation can be saved, thereby enhancing the downsizing of the image reader. On the other hand, a light-emitting unit, such as a light-emitting diode, should be disposed in the vicinity of the input surface of the fiber optic plate 19. This does not necessarily satisfy the requirements of reducing the size, in particular, the thickness, of the fingerprint reader. Additionally, this type of reader is costly.

SUMMARY OF THE INVENTION

Accordingly, it is an object of the present invention to provide an inexpensive, miniaturized and thin image reading apparatus for reading various types of images, such as fingerprints, free from the foregoing problems.

In order to achieve the above object, according to the present invention, there is provided an image reading apparatus comprising: a transparent substrate; a light-emitting unit for emitting light to pass through the transparent substrate and to be applied to a subject pressed against the transparent substrate; a plurality of light-receiving units disposed on the transparent substrate in the vertical and horizontal directions with intervals therebetween, the light-receiving units receiving the light which is emitted from the light-emitting unit and is reflected from the subject; and reading means for reading an image of the subject in accordance with the amount of light received by the light-receiving units.

In the invention, the light-receiving units may comprise thin-film transistors formed of semiconductor and having active layers, exhibiting photoconductive characteristics in which an electric charge is generated in accordance with the amount of the light reflected from the subject and received by the light-receiving units.

In the invention, the light-receiving units may be provided on the surface of the transparent substrate against which the subject is pressed.

In the invention, the reading means may comprise a received-light-voltage generating circuit which generates a received-light voltage in accordance with the amount of electric charge generated by the light-receiving units, and image-signal output means which outputs an image signal in response to the received-light voltage generated by the received-light-voltage generating circuit.

In the invention, the light-emitting unit may comprise a light-emitting unit for emitting rays of light representing a plurality of different colors.

DESCRIPTION OF THE PREFERRED EMBODIMENT

An image reading apparatus of the present invention will now be described through illustration of a fingerprint reader by way of example.

Figure 1:
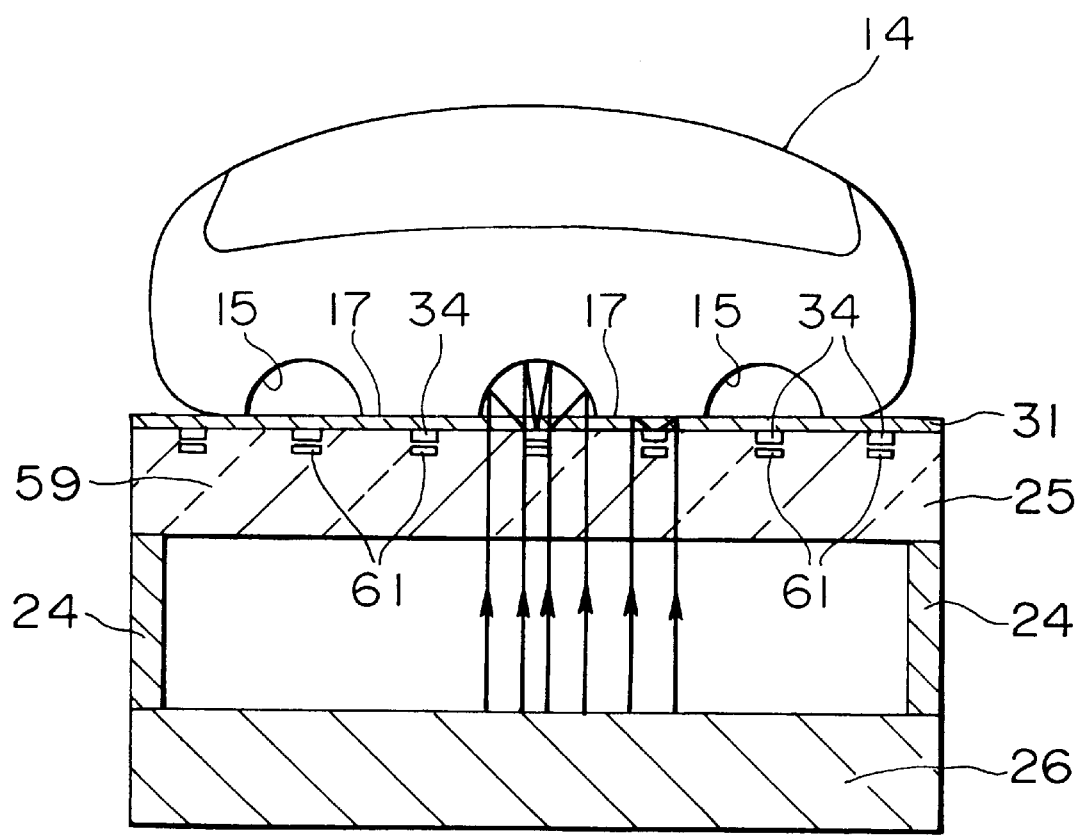
FIG. 1 is a sectional side elevation illustrating an image reading apparatus according to an embodiment of the present invention.

The fingerprint reader shown in FIG. 1 is schematically constructed of a transparent substrate 59, a two-dimensional image sensor 25, and a light-emitting unit 26 located below the image sensor 25. The image sensor 25 is formed by disposing light-receiving units 34 and reading means on the transparent substrate 59. In the fingerprint reader shown in FIG. 1, the two-dimensional image sensor 25 and the light-emitting unit 26 are interconnected via an interconnecting member 24. Further, a protective film 31 is formed on the surface of the image sensor 25, while a light-shielding film 61 is formed below each light-receiving unit 34 of the image sensor 25 to protect light emitted from the light-emitting unit 26 from being directly incident on the light-receiving units 34.

The type of light-emitting unit 26 is not particularly restricted as long as it can emit light to a finger pressed on the image sensor 25. The light-emitting unit 26 may include specifically, but not exclusively, various light-emitting devices represented by backlight, such as fluorescent lamps, and reflectors, such as mirrors, which will be described below.

The transparent substrate 59 may be formed of any material as long as it can transmit light from the light-emitting unit 26, and may include specifically, but not exclusively, glass plates or resin film. The light-receiving units 34 possess photoconductive properties in which an electric charge is generated by receiving light, and the units 34 are disposed in the transparent substrate 59 in the vertical and horizontal directions at predetermined intervals. As the light-receiving units 34, in particular, thin-film transistors (TFT) having a photoconductive active layer are suitably used.

Figure 2:
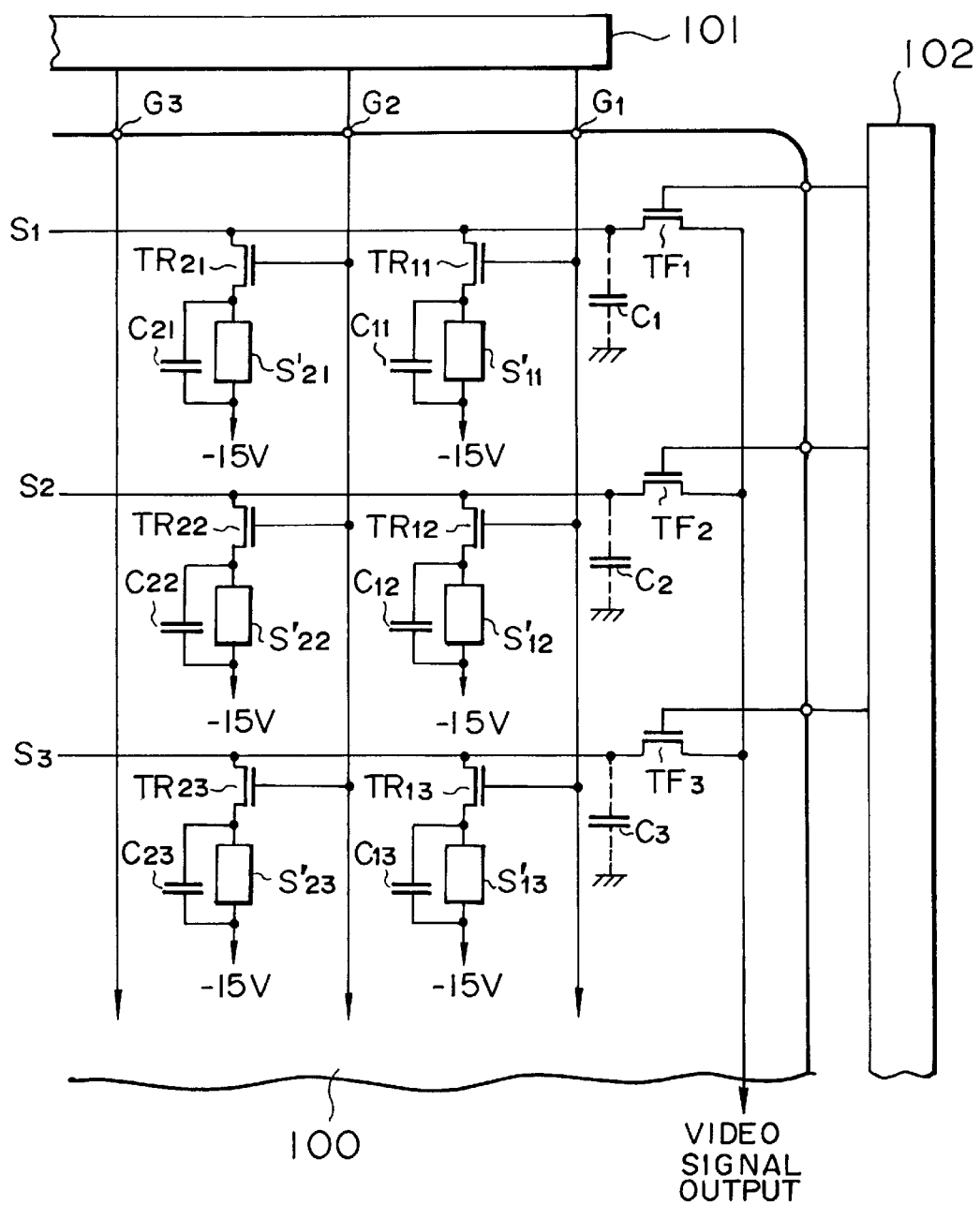
FIG. 2 is a circuit diagram illustrating an example of the configuration of a two-dimensional image sensor.

The two-dimensional image sensor 25 is constructed by forming reading means and light-receiving units, both of which are represented by the circuit, such as the one shown in FIG. 2, on a transparent substrate. Referring to FIG. 2, sensor cells each forming a pixel are two-dimensionally disposed in a matrix form on a TFT sensor 100. Each sensor cell is formed of a light-receiving unit S'xx (x is a certain integer, which will also be applied to the following description in this specification) exhibiting photoconductive characteristics in which an electric charge is generated in accordance with the light received by the light-receiving unit S'xx, a capacitor Cxx in which the charge generated in the light-receiving unit is accumulated, and an emission-control switching device TRxx that reads out the charge to a source line Sx.

A sub-scanning shift register 101 sequentially selects a plurality of gate lines Gx of the TFT sensor 100 one by one and actuates the emission-control switching device TRxx connected to the selected gate line Gx. Moreover, a main-scanning shift register 102 sequentially selects the switching devices TFx one by one connected to the respective source lines Sx of the TFT sensor 100 and actuates the selected switching device TFx.

According to the foregoing operation of the sub-scanning shift register 101 and the main-scanning shift register 102, one of the sensor cells is selected from the sensor array of the TFT sensor 100, and the charge generated in the selected sensor cell is output as a video signal. As a result, a subject image represented by the video signal is read according to the quantity of light received by the light-receiving unit 34.

For use of the aforedescribed fingerprint reader, a finger 14 is, as illustrated in FIG. 1, pressed against the two-dimensional image sensor 25 to intimately contact the sensor 25, while the light-emitting unit 26 emits light to the finger 14. The light reflected from the surface of the finger 14 is then detected by the light-receiving unit 34 of the image sensor 25. The fingerprint pattern can be detected due to a disparity in the intensity of the light reflected from the finger 14 between depressions 15 and ridges 17 of the fingerprint. More specifically, it will now be assumed that the angle of the effective light to be incident on the light-receiving units 34 is predetermined to be 45 degrees. Then, the light emitted from the light-emitting unit 26 is deflected in a roundabout manner on the depressions 15 of the fingerprint, with the result being that a large amount of light impinges on the light-receiving units 34. In contrast, the light emitted from the light-emitting unit 26 is not deflected on the ridges 17, which are contacting the image sensor 25, but travels straight to the ridges 17, so that only a small amount of light strikes the light-receiving units 34. In this manner, the depressions 15 and the ridges 17 of the fingerprint can be differentiated according to the quantity of the light incident on the light-receiving units 34, and image information concerning the fingerprint can be captured. It is particularly easy to distinguish the ridges 17 from the depressions 15 because the ridges 17 cover the light-receiving units 34.

Although a typical resolution required for detecting fingerprints is 100 $\mu$m, a resolution of as low as about 50 $\mu$m is sufficient to detect fingerprints by use of the foregoing reader.

The following deficiencies are, however, encountered by the aforedescribed two-dimensional image sensor 25 shown in FIG. 2. When a certain sensor cell is selected to read out an electric charge having the amount Q generated in the selected cell to the corresponding source line Sx, a resulting output signal may sometimes be reduced to approximately $\frac{1}{100}$. Additionally, the pulse for turning the switching device TFx on or off may flow into a resulting output signal through a parasitic capacitance generated in the switching device TFx. The amount of a pulse leakage varies among the individual switching devices due to a difference between the devices when manufactured. Because of this variation, vertical (or horizontal) bright and dark streaks may emerge as fixed pattern noise on a picture representing the read image, thereby degrading the picture quality. Further, amorphous silicon or polysilicon, which may be used for the switching devices, contain many crystalline defects. Accordingly, a signal charge may be trapped by the defects, generating random noise. Additionally, the switching speed of the switching devices made of amorphous silicon or polysilicon is low, thereby failing to perform a high-speed reading operation.

To overcome the above-described drawbacks, the following structure may preferably be used to achieve high-speed reading. All of the signal charges output to the source line are completely transferred to the switching devices and are efficiently transformed to signal voltages without incurring any loss while being resistant to noise. Also, a plurality of received-light-voltage generating circuits are employed to read received-light voltages in a parallel direction. Further, a multiplexer, which serves as a parallel-to-serial conversion circuit, is used as image-signal output means.

Since the light-receiving units are fabricated on a substrate by using amorphous silicon or polysilicon, the received-light voltage circuits may be simultaneously produced with the light-receiving units by using the same amorphous silicon or polysilicon, though the circuits may be made by single-crystal silicon. The multiplexer may be preferably formed by single-crystal silicon to achieve the requirement of high speed.

In the image sensor illustrated in FIG. 2, the switching devices are made by thin-film transistors, while the photosensors are produced by p-i-p diodes or photoconductive materials, such as cadmium sulfide-selenium (CdS-Se). Accordingly, due to a difference in the structure between the above two materials, two different types of films should be separately formed to produce the switching devices and the photosensors, which doubles the time required for the manufacturing process. The manufacturing cost is also increased. To correct this shortcoming, the photosensor devices are preferably formed by thin-film photo-transistors, making the structure of the photosensor devices substantially the same as that of the switching devices, thereby simplifying the manufacturing process.

However, a larger dark current may flow in the thin-film photo-transistors as compared with the p-i-n photodiodes, and may further accumulate together with an optical charge and be disadvantageously transformed to a signal charge if signal reading takes time. To overcome this drawback, a combination of a plurality of received-light-voltage generating circuits and a multiplexer may be desirably used to perform a high-speed reading operation.

In this manner, thin-film photo-transistors, a plurality of received-light-voltage generating circuits, and a multiplexer may be combined to provide an inexpensive two-dimensional image sensor free from the foregoing various problems.

A description will now be given with reference to the drawings of a number of examples of a two-dimensional image sensor suitably used for an image reading apparatus according to the present invention.

EXAMPLE 1

Two-dimensional Image Sensor

Figure 3:
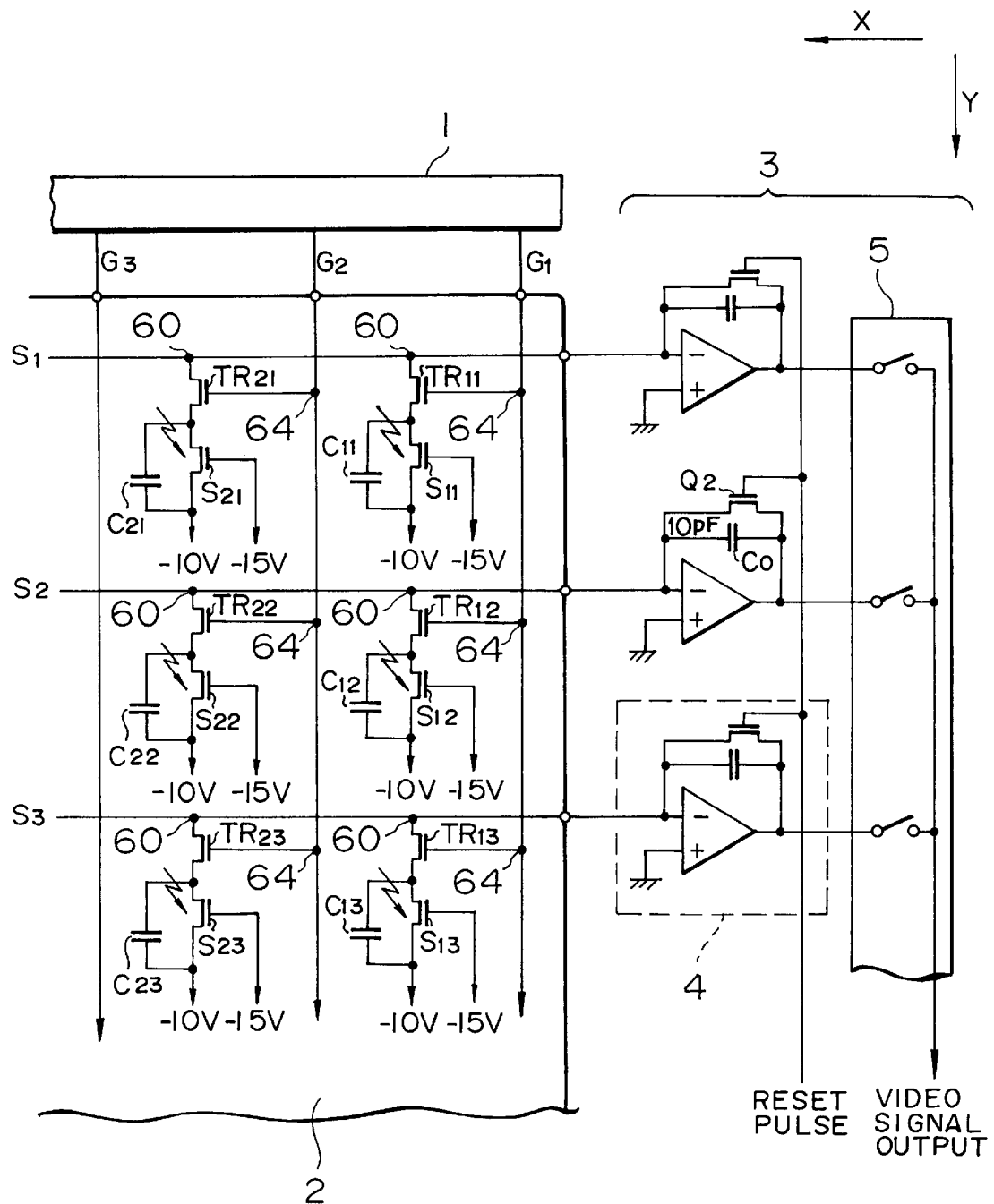
FIG. 3 is a circuit diagram illustrating the configuration of a two-dimensional image sensor described in Example 1.

The two-dimensional image sensor represented by the circuit diagram shown in FIG. 3 are, by and large, constructed of a scanning shift register 1, a TFT sensor 2, and external drive circuitry 3.

The scanning shift register 1 sequentially selects a plurality of gate lines Gx one by one and supplies a scanning signal to the selected gate line Gx. Thus, among emission-control switching devices TRx formed of thin-film transistors disposed on the TRT sensor 2, the switching device TRx connected to the selected gate line Gx is actuated. In FIG. 3, arranged on the TFT sensor 2 are sensor cells forming the individual pixels in a two-dimensional matrix form.

Each sensor cell is constructed of a light-receiving unit Sxx which generates an electric charge according to the amount of received light, a capacitor Cxx in which the charge generated in the light-receiving unit Sxx is stored, and an emission-control switching device TRxx that reads the charge stored in the capacitor Cxx to a source line Sx and also controls the emission of the charge. Charge-emission terminals 60 provided for the respective emission-control switching devices TRxx and arranged in the horizontal direction are connected in common to the same source line Sx, and the source line Sx forms a charge transfer path from the terminals 60.

Moreover, control terminals 64 for the respective emission-control switching devices TRx arranged in the vertical direction are connected in common to the same gate line Gx that forms a path through which scanning signals for controlling charge transfer are transmitted.

A received-light-voltage generating circuit 4 is connected to each source line Sx to generate a received-light voltage in accordance with the quantity of charge transferred through the associated source line Sx. The circuit 4 maintains the source line Sx at a reference potential or a bias potential determined by the reference potential.

Figure 4:
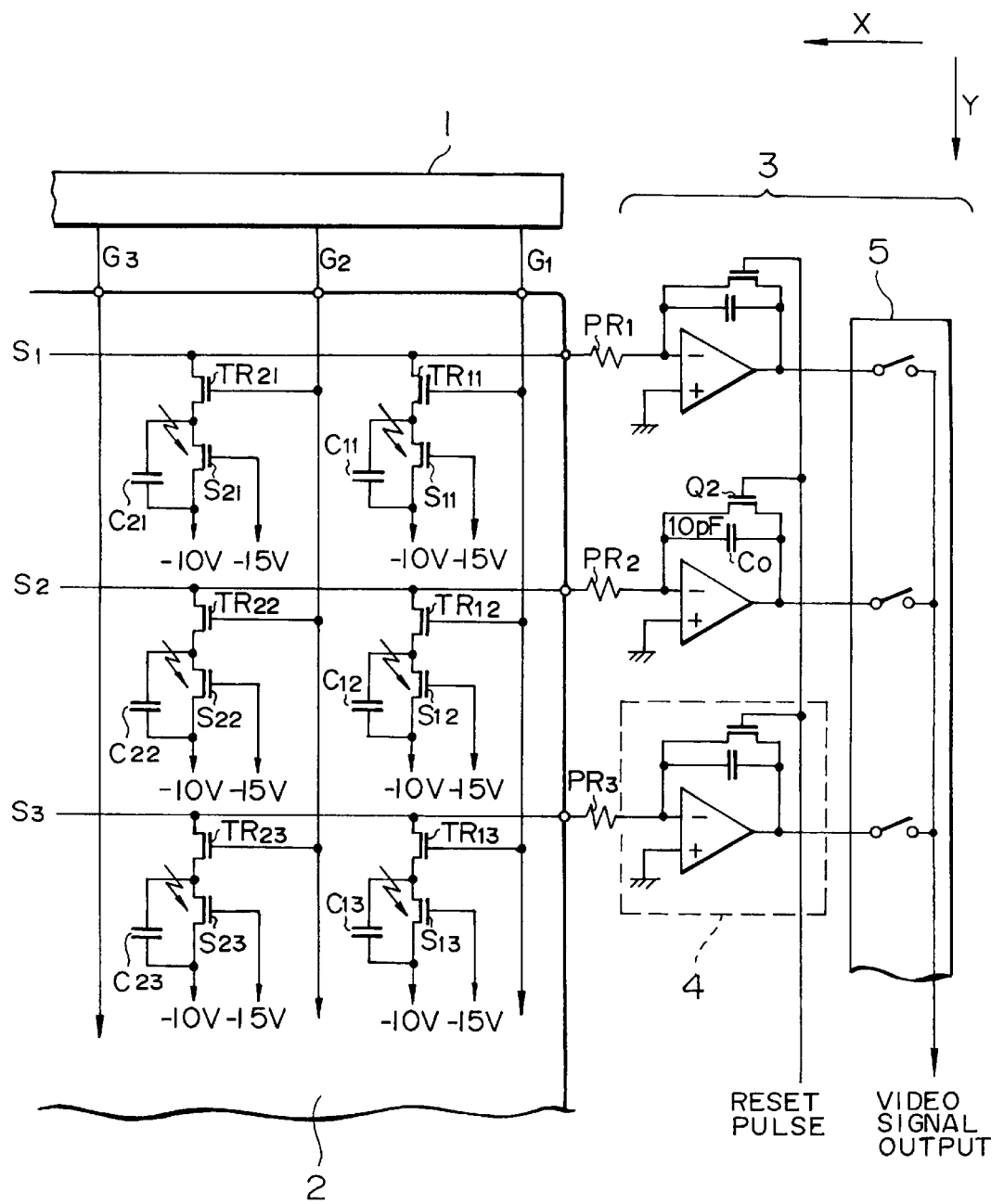
FIG. 4 is a circuit diagram illustrating the configuration of a two-dimensional image sensor to which protective resistors PRx are added to the image sensor shown in FIG. 3.

FIG. 4 is a circuit diagram of a modification made to the image sensor shown in FIG. 3, and more specifically, a protective resistor PRx is inserted on each source line Sx, which connects the corresponding charge-emission terminal 60 of the TFT sensor 2 and the received-light-voltage generating circuit 4. FIGS. 3 and 4 illustrate exactly the same circuit configuration, except for the presence of the protective resistors PRx in the circuit shown in FIG. 4.

The protective resistors PRx serve to protect the operational amplifiers used in the external drive circuitry 3 and the power supply for driving the operational amplifiers if the gate line Gx and the source line Sx are short-circuited. The resistance of the protective resistors PRx is much smaller than the resistance generated when the transistor TRx is actuated, i.e., than the on-resistance of the transistor TRx. In this embodiment, the resistance of the protective resistors PRx is 100 [KΩ].

Figure 5:
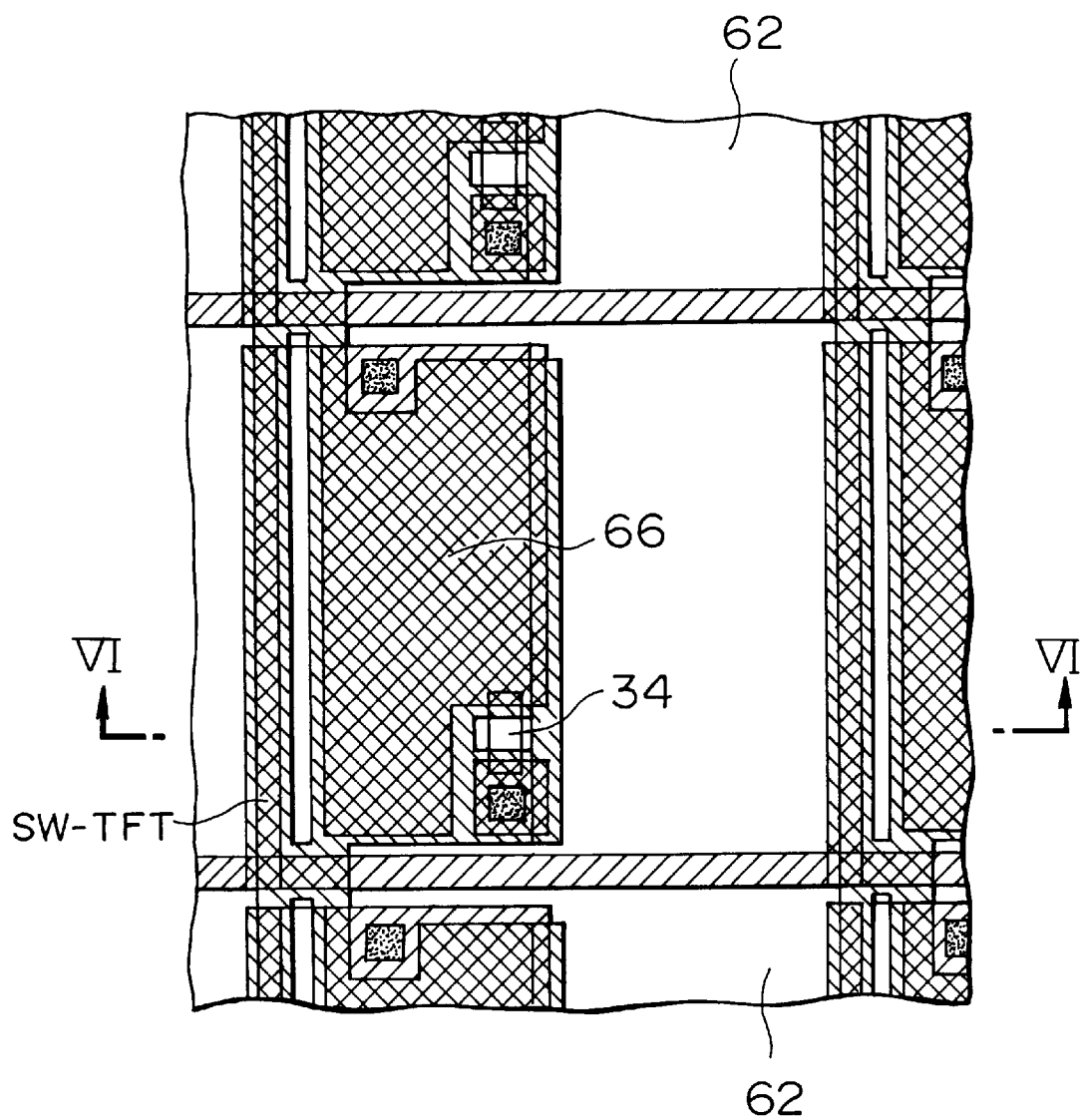
FIG. 5 is a plan view illustrating the structure of a sensor cell.
Figure 6:
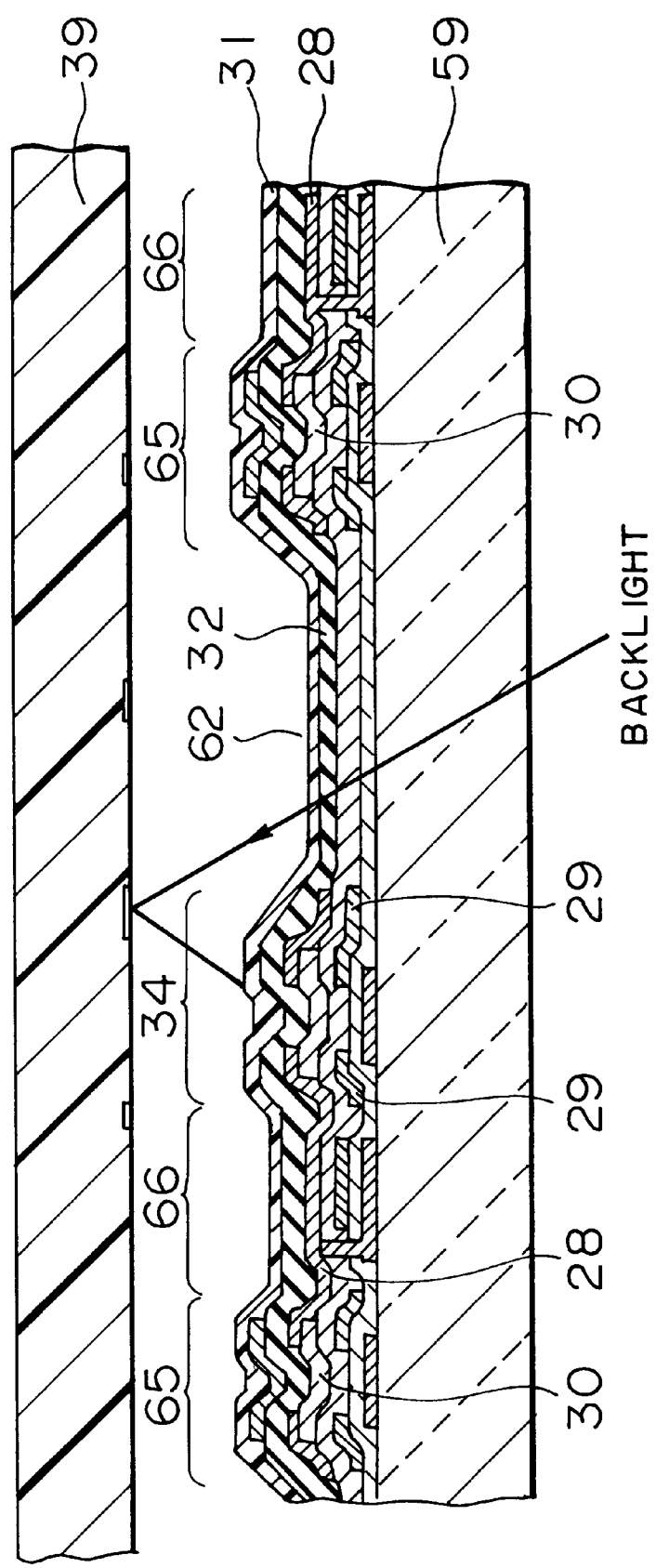
FIG. 6 is a sectional side elevation illustrating the structure of a sensor cell.

A detailed explanation of the TFT sensor 2 is as follows. FIG. 5 is a plan view illustrating the structure of one sensor cell arranged on the TFT sensor 2 shown in FIG. 3. FIG. 6 is a cross-sectional view taken along line VI—VI' of FIG. 5.

The TFT sensor 2 is, by and large, constructed of an emission-control switching device 65 (SW-TFT: corresponding to TRxx shown in FIG. 3), an optical-charge storage capacitor CS 66 (equivalent to Cxx shown in FIG. 3), a light-receiving unit 34, and an illumination window 62, all of which are disposed on a transparent substrate 59. Light output from a light-emitting unit (not shown) which is located below the TFT sensor 2 passes through the window 62 and is further directed onto a subject.

One light-receiving unit 34 shown in FIG. 5 is, for example, 5 [μm] wide and 8 [μm] long.

Referring to the cross-sectional view of FIG. 6, a metallic layer 28, formed of wiring or an electrode connected to an amorphous silicon layer 30, is coated with a transparent insulating layer 32 made from silicon nitride.

A protective film 31 formed of a silicon nitride film (100 to 400 nm) or a polyimide resin film (1 to 50 μm) is deposited as the uppermost layer. A subject 39 is directly placed on the protective film 31 to intimately contact the film 31. The protective film 31 is preferably as thin as possible to such a degree as to not impair its protecting function. The thick protective film 31 inevitably increases the distance between a subject and the light-receiving unit 34, thereby degrading the resolution. In this embodiment, light-shielding electrodes 29 are further provided to protect light output from the light-emitting unit from directly striking the light-receiving units before impinging on the subject.

Figure 7:
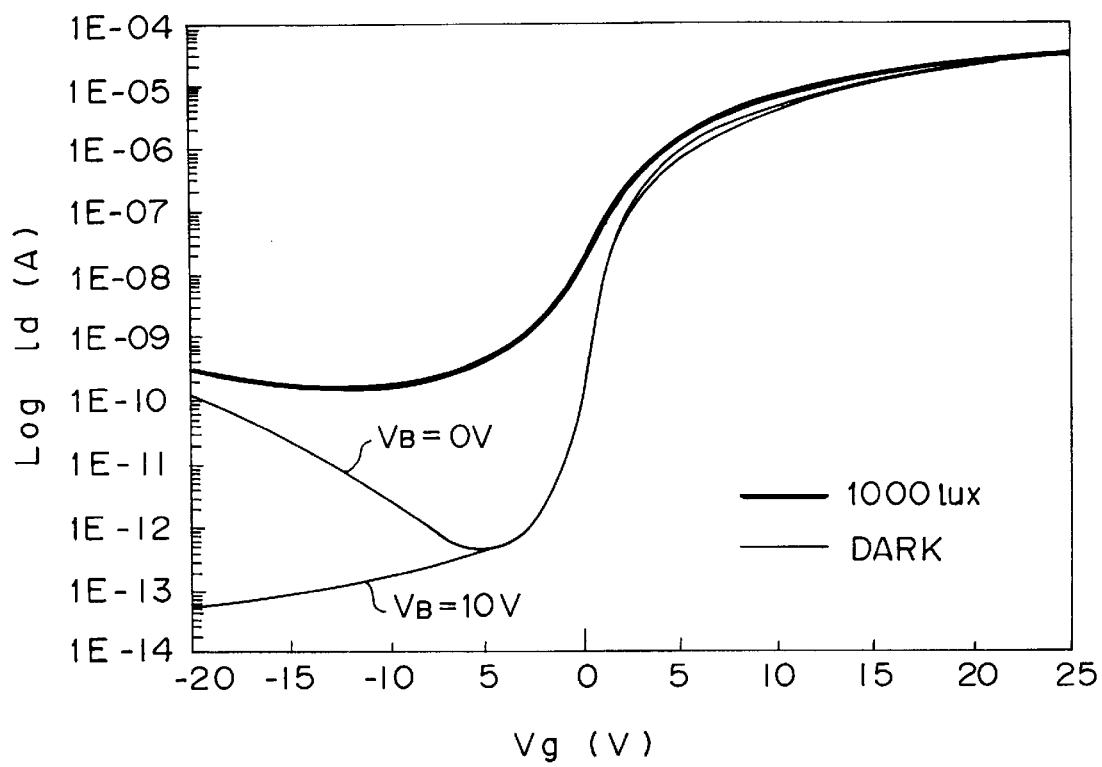
FIG. 7 is a diagram illustrating the characteristics of a thin-film transistor used in a light-receiving unit.

FIG. 7 is a diagram illustrating the characteristics of a thin-film transistor forming the light-receiving unit shown in FIG. 3. In this diagram, the horizontal axis indicates a gate voltage Vg of the thin-film transistor, while the vertical axis represents a drain current Id obtained when a fixed voltage (for example, 12 [V]) is applied between the TFT's drain and source. Further, the thick line indicates the relationship between the gate voltage Vg and the drain current Id when light having luminous intensity of 1000 [lux] is applied to the thin-film transistor, while the thin lines (Dark) designate the above same relationship when light is not applied to the thin-film transistor. $V_B$ shown in the diagram indicates voltages applied to the light-shielding electrodes 29.

FIG. 7 reveals that the drain current Id with respect to a negative region of the gate voltage Vg greatly differs depending on whether or not light applied to the transistor when the light-shielding electrodes exhibit a sufficient voltage (in this example, 10 [V]). Namely, the above-described thin-film transistor has a high sensitivity to light when its gate voltage Vg is negative.

The external drive circuitry 3 shown in FIG. 3 is constructed of a plurality of received-light-voltage generating circuits 4 and one multiplexer 5. The multiplexer 5 selects one voltage (output signal) from the received-light voltages of the received-light-voltage generating circuits 4, and outputs the selected voltage (output signal) as a video signal.

Figure 8:
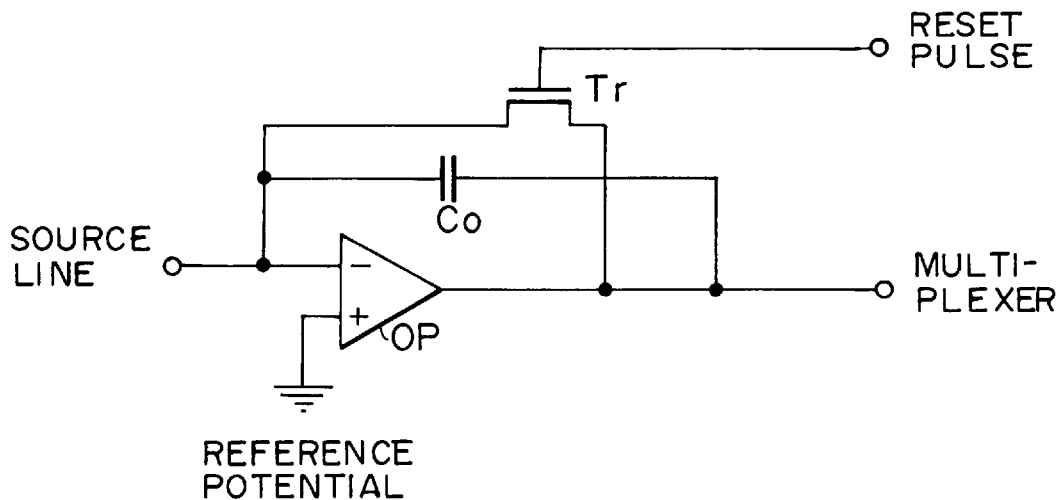
FIG. 8 is a circuit diagram illustrating a received-light-voltage generating circuit used in the two-dimensional image sensor described in Example 1.

FIG. 8 is a circuit diagram illustrating the received-light-voltage generating circuit 4 shown in FIG. 3. FIG. 8 shows that the negative input terminal of the operational amplifier OP is connected to the source line Sx of the TFT sensor 2, while the positive input terminal of the operational amplifier OP is coupled to the reference potential 0[V]. Connected between the output terminal and the negative input terminal of the operational amplifier OP are a charge-absorbing capacitor Co and a transistor-formed reset switching device Tr which are disposed parallel to each other.

Figure 9:
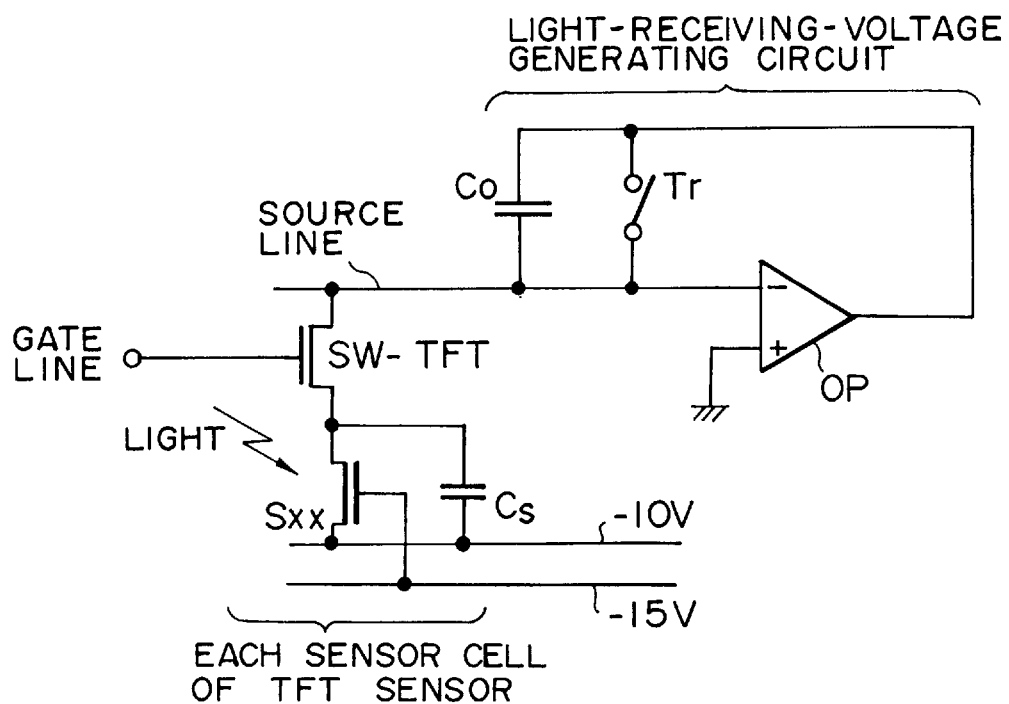
FIG. 9 illustrates the operation principle of the two-dimensional image sensor described in Example 1.

The operation of the image sensor constructed as described above will now be described while referring to FIG. 9. For simple representation, only one sensor cell arranged on the TFT sensor 2 and the corresponding received-light voltage generating circuit 4 are shown in FIG. 9.

Since the gate electrode of the thin-film transistor, i.e., the light-receiving unit Sxx, is fixed at 15 [V], the transistor is rendered inoperable (the resistance between the transistor's source and drain is high) when light is not applied to the transistor. Further, the positive input terminal of the operational amplifier OP is coupled to a ground (GND) (0[V]), and the potential of the negative input terminal (source line) is inevitably 0 [V].

In the above inactivated state, upon application of light to the light-receiving unit Sxx, the resistance between the corresponding TFT's source and drain is reduced in accordance with the intensity of the received light, causing a current to flow between the transistor's source and drain, thereby lowering the voltage of the capacitor Cs (optical charge is stored in the capacitor Cs).

Thereafter, the switching device (SW-TFT) is actuated to read the charge accumulated in the capacitor Cs to the source line Sx. The voltage of the source line Sx is reduced from 0 [V] (GND level) due to the charge read to the source line Sx.

Then, the operational amplifier OP detects the voltage of the source line Sx and increases the voltage output from the amplifier so as to raise the voltage of the source line Sx via the capacitor Co, thereby returning the potential of the source line Sx to 0 [V]. The amount of an increase in the voltage of the operational amplifier OP is output as a received-light voltage (optical-charge output voltage) to the multiplexer 5 (see FIG. 3).

According to the operation discussed above, since the voltage of the source line Sx is constantly maintained at 0[V], an electric charge representing a pixel which was read prior to this operation does not remain in the source line Sx, which would otherwise cause after-image.

Figure 10A:
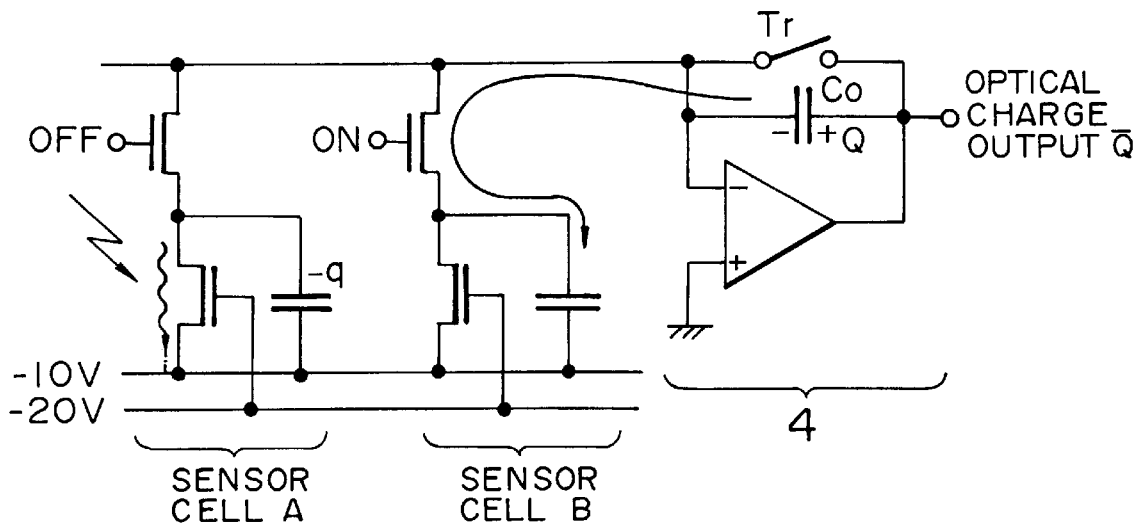
FIG. 10, which is comprised of FIGS. 10A and 10B, illustrates the operation principle of the two-dimensional image sensor in which two sensor cells are connected in common to the same source line.
Figure 10B:
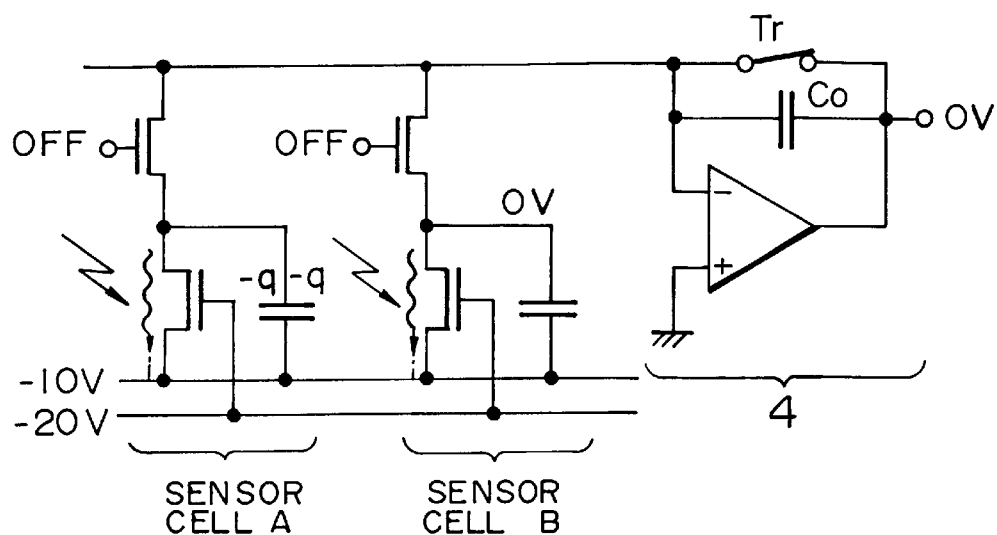
Figure 11:
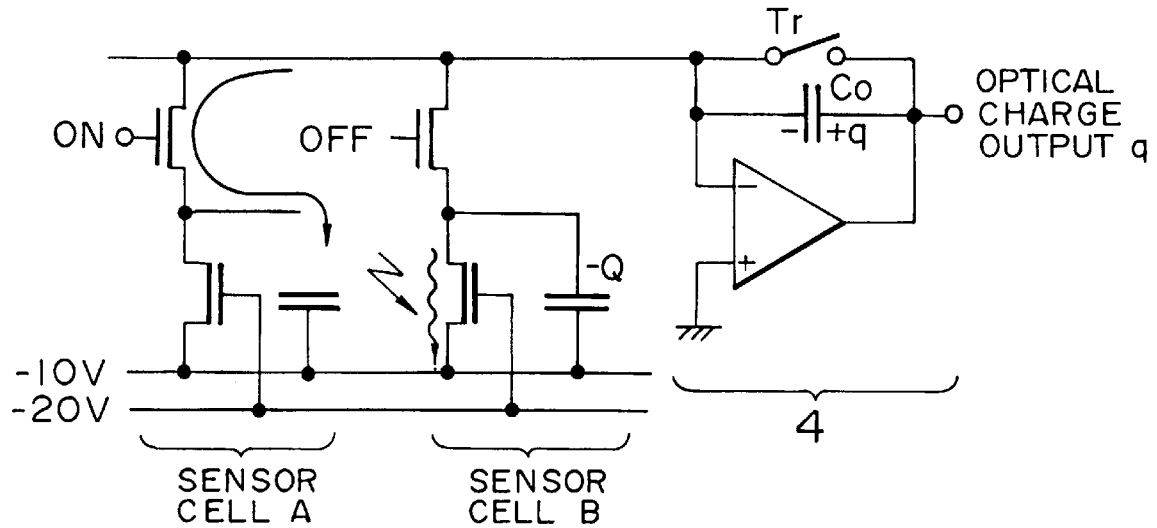
FIG. 11, which is comprised of FIGS. 11A and 11B, illustrates the operation principle of the two-dimensional image sensor in which two sensor cells are connected in common to the same source line.
Figure 11:
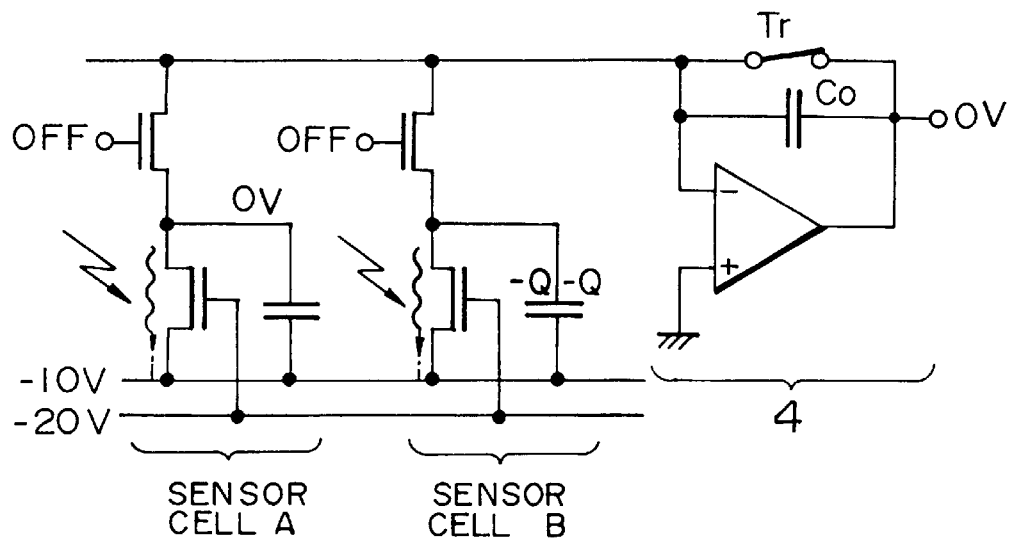

FIGS. 10 and 11 illustrate the principle of the operation of the image sensor 25 when two sensor cells are connected in common to the same source line Sx. The operations of the sensor cells A and B and the received-light-voltage generating circuit 4 are similar to those explained while referring to FIG. 9.

In FIG. 10A, optical charge −Q generated in the sensor cell B is read, and concurrently, optical charge −q is accumulated in the capacitor of sensor cell A. Subsequently, in FIG. 10B, the reset switching device Tr of the received-light-voltage generating circuit 4 is actuated to reset the charge accumulated in the charge-absorbing capacitor Co. Simultaneously, the sensor cell A continues to store the optical charge −q, and the sensor cell B also starts to store the optical charge −Q.

Referring to FIG. 11A, the optical charge −q generated in the sensor cell A is read, and at the same time, the optical charge −Q is accumulated in the capacitor of the sensor cell B. Thereafter, in FIG. 11B, the reset switching device Tr is once again turned on to reset the charge accumulated in the charge-absorbing capacitor Co. Concurrently, the sensor cell B continues to accumulate the optical charge −Q, and the sensor cell A also commences to store the optical charge −q.

The image sensor shown in FIGS. 10 and 11 then repeat the aforedescribed cycle.

As has been discussed above, typical two-dimensional contact-type TFT image scanners use photodiodes for photoelectric conversion devices. Accordingly, the photodiodes as conversion devices and a-Si thin-film transistors used as switching devices should be separately formed, thereby making the manufacturing process complicated.

In the image sensor of this example, however, a-Si thin-film transistors are employed to produce both devices (i.e., switching devices and photosensor devices), which makes it possible to manufacture the resulting image scanner with only one process. Accordingly, the manufacturing process of this sensor can be simplified as compared with conventional two-dimensional contact-type TFT image sensors.

Further, since charges accumulated in the capacitor of the sensor cell can be wholly read to the readout circuit, rays of light indicating a plurality of colors, for example, three RGB colors, emitted from the light-emitting unit can be instantaneously switched without any interval, free from producing after-image. Also, the provision of a reset switching device in a pixel (sensor cell) is unnecessary, which makes it possible to reduce the size of individual pixels and increase the number of pixels per unit area, thereby improving the resolution of the image sensor.

Moreover, a reading operation is performed by means of current flowing, i.e., the input resistance of the amplifier is 0[Ω], and the voltage generated in the source line of the sensor array is almost negligible. As a consequence, crosstalk between signals at a wiring crossover can be suppressed.

EXAMPLE 2

Two-dimensional Image Sensor

A modification may be made to the two-dimensional image sensor 25 represented by the circuit shown in FIG. 3 (Example 1). Namely, the received-light-voltage generating circuit 4 indicated in FIG. 12 may be used to form the external drive circuitry of the image sensor.

Figure 12:
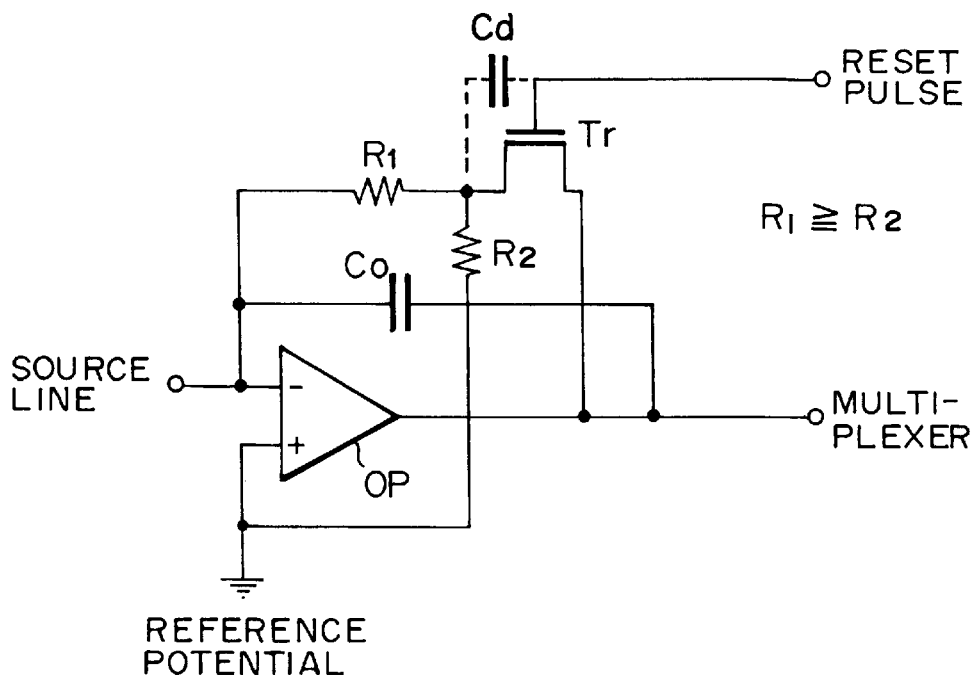
FIG. 12 is a circuit diagram illustrating a received-light-voltage generating circuit of a two-dimensional image sensor described in Example 2.

In the circuit shown in FIG. 12, a resistor R2 is inserted to suppress a reset pulse from entering the input terminal of the operational amplifier OP via a parasitic capacitance Cd generated between the transistor's Tr gate and drain. The impedance (the resistance in relation to an alternating current) ZC of the parasitic capacitance Cd can be calculated by the following equation.

$$ZC = 1/(2\pi f Cd) \ [\Omega]$$

Thus, when the higher-harmonic frequency f of the reset pulse is 100 [kHz], and the parasitic capacitance Cd is 0.5 [pF], these values are substituted into the above equation to obtain:

$$ZC = 1/(2 \times 3.14 \times 100 \times 10^3 \times 0.5 \times 10^{-12}) = 3.2 \ [M\Omega]$$

Accordingly, if the resistance of the resistor R2 is one tenth of or less than 3.2 [MΩ], the voltage leakage to the input terminal of the operational amplifier OP is reduced to one tenth or less due to the voltage divider formed by the parasitic capacitance ZC and the resistor R2. Thus, the resistance of the resistor R2 suitably ranges from 1 [kΩ] to 100 [kΩ].

The resistance of a resistor R1 arranged in the circuit shown in FIG. 12 is determined in the following manner. A potential difference between the two input terminals of an ideal amplifier under normal operating conditions is 0 [V]. In practice, however, there exists an offset voltage on the order of 10 [mV] between the input terminals. During signal reading (approximately 60 [μseconds]), a leakage current caused by the offset voltage flows to a GND via the resistors R1 and R2, and also emerges together with a signal current in an output of the operational amplifier, causing the generation of noise. Thus, the resistance of the resistor R1 is desirably set as high as possible. If, however, the resistance of the resistor R1 is too high, a signal current stored in the capacitor Co cannot be reset during a predetermined reset period. In consideration of the above factors, the resistance of the resistor R1 suitably ranges from 100 [kΩ] to 220 [kΩ].

EXAMPLE 3

Two-dimensional Image Sensor

Figure 13:
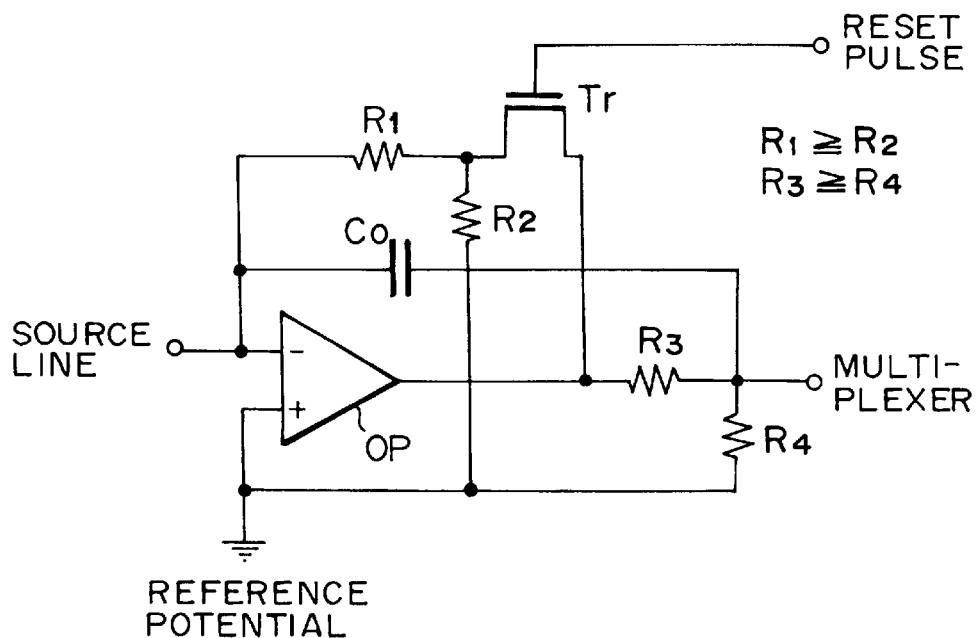
FIG. 13 is a circuit diagram illustrating a received-light-voltage generating circuit of a two-dimensional image sensor described in Example 3.

In place of the circuit shown in FIG. 8, the circuit configured as illustrated in FIG. 13 may be used as the received-light-voltage generating circuit in the image sensor.

In the circuit shown in FIG. 13, since a signal-charge storage (feedback) capacitor Co is connected to the node between resistors R3 and R4, a signal output comparable to an output from the amplifier shown in FIG. 8 or 12 can be obtained from the node between the resistors R3 and R4. In FIG. 13, in order to generate a voltage at the node between the resistors R3 and R4 equivalent to the voltage directly output from the amplifier shown in FIG. 8 or 12, the operational amplifier is operated to output a voltage higher than the voltage, which would be generated in the absence of the resistors R3 and R4, to compensate for a voltage drop caused by the resistors R3 and R4. The input voltages to the multiplexer and the analog-to-digital converter disposed at the subsequent stages of the operational amplifier are approximately 1 [V]. Thus, the voltage (approximately 10

[V]) for resetting the capacitor Co is desirably set as high as possible, and the resistance of the resistor R1 can be determined to be high, accordingly. The resistances of the resistors R3 and R4 may be selected from a wide range from 10 [Ω] to 1 [MΩ].

EXAMPLE 4

Two-dimensional Image Sensor

Figure 14:
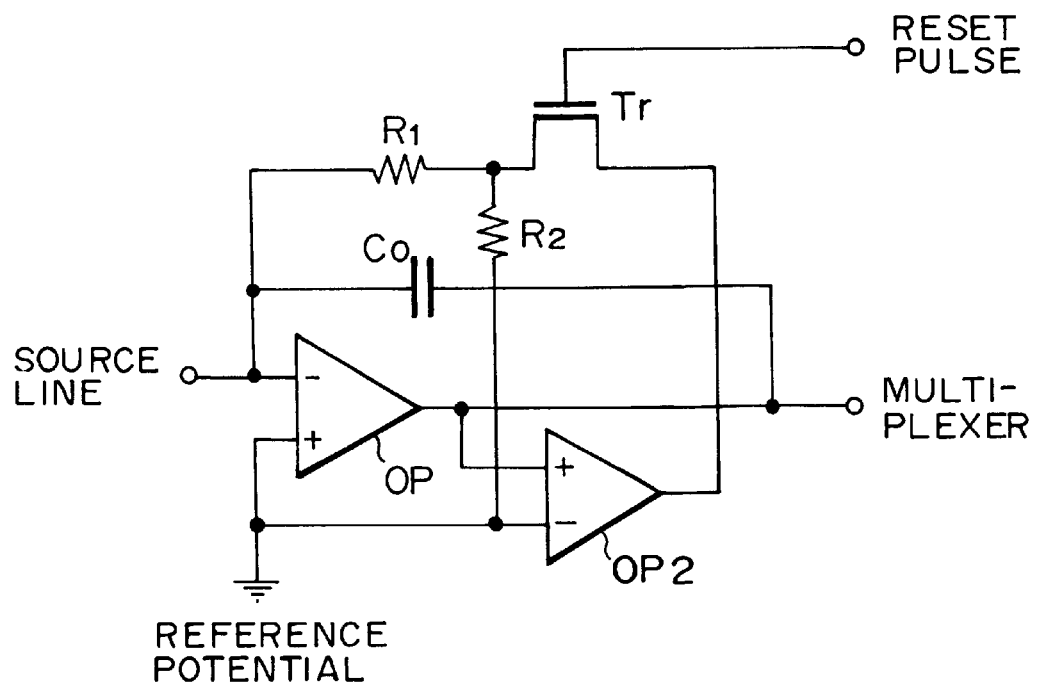
FIG. 14 is a circuit diagram illustrating a received-light-voltage generating circuit of a two-dimensional image sensor described in Example 4.

A further modification may be made to the circuit shown in FIG. 8 to use the circuit illustrated in FIG. 14 as the received-light-voltage generating circuit 4 in the external drive circuitry.

As has been explained in Example 3, the voltage of the capacitor Co is desirably set as high as possible, because the resistance of the resistor R1 can be determined to be high. Thus, a leakage current inducing the occurrence of noise can be suppressed. In this example, the circuit using a comparator, which is more effective to regulate voltages than the circuit using voltage dividers formed by resistors, as shown in FIG. 13, will be explained.

The comparator OP2 is operable only when the signal-charge storage (feedback) capacitor Co is reset. During signal reading, even a slight output of the operational amplifier OP is detected by the comparator OP2 due to a deviation of the output potential of the operational amplifier OP from the GND potential. The comparator OP2 thus increases the output voltage to the power supply voltage. In this manner, the capacitor Co can be sufficiently reset even though the resistance of the resistor R1 is high.

EXAMPLE 5

Two-dimensional Image Sensor

Figure 15:
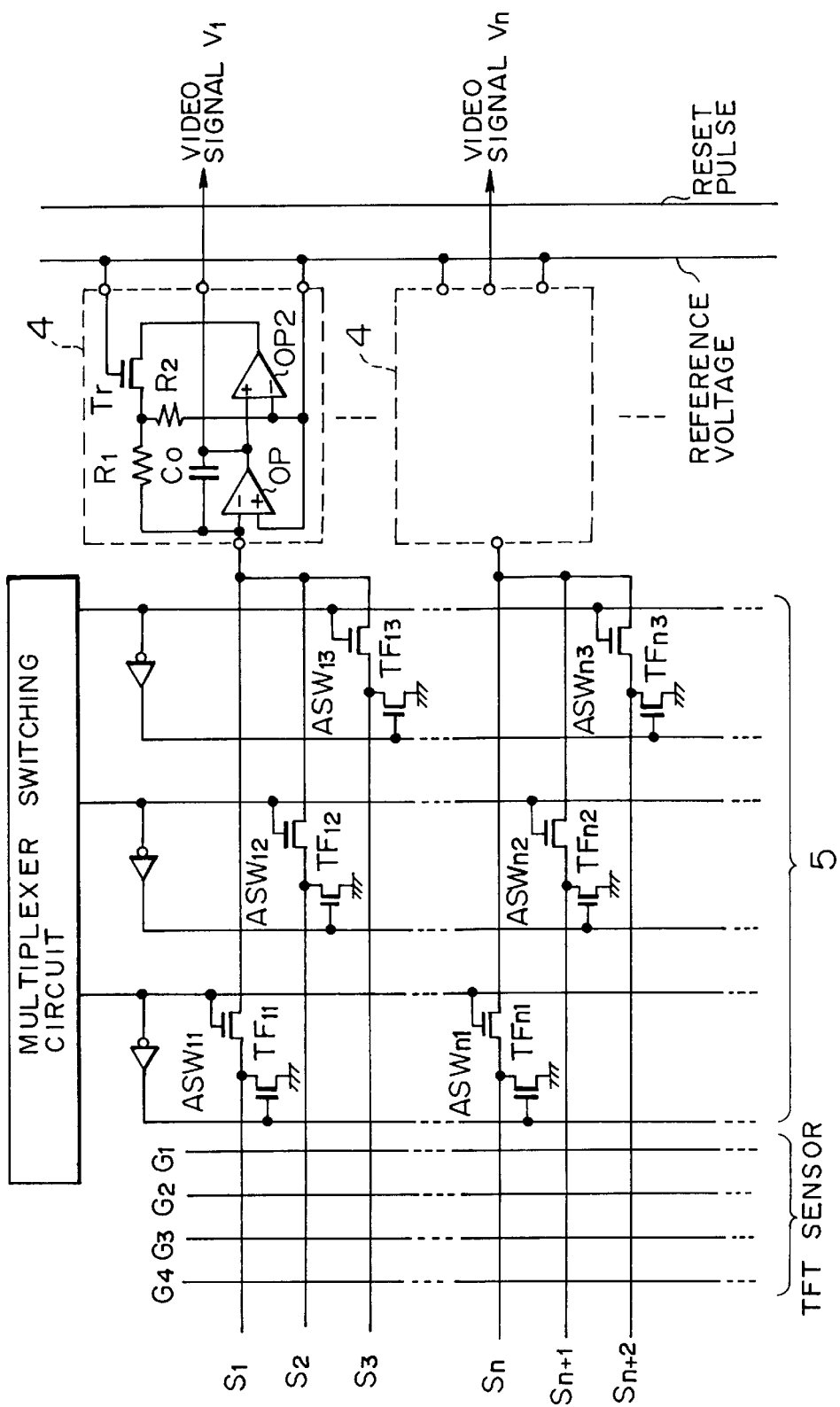
FIG. 15 is a circuit diagram illustrating the configuration of a two-dimensional image sensor described in Example 5.

FIG. 15 is a circuit diagram illustrating an inexpensive image sensor system formed by decreasing the number of received-light-voltage generating circuits.

In the circuit illustrated in FIG. 3, the received-light-voltage generating circuits and the source lines are connected based on a one-for-one correspondence. Accordingly, received-light voltages (output signals) of the respective circuits 4 are input into the multiplexer 5 in which the received-light voltages (output signals) are sequentially selected one by one to be output as a video signal.

To perform the voltage input operation more efficiently, the number of received-light-voltage generating circuits may be reduced to smaller than the number of source lines. More specifically, a multiplexer is provided, as illustrated in FIG. 15, at the previous stage of the received-light-voltage generating circuits 4, to sequentially switch a plurality of source lines. The signal of the selected source line is then input into the corresponding received-light-voltage generating circuit 4. The unselected source lines are respectively connected to the reference voltages via active switches ASWxx, so that the optical charge read out to the unselected source lines shortly disappear; the previously read charge would otherwise remain to induce after-image.

In the circuitry shown in FIG. 15, the two-dimensional image sensor circuit illustrated in FIG. 14 (Example b 4) is used as the received-light-voltage generating circuit 4. Any of the circuits (Examples 1, 2 and 3), however, respectively shown in FIGS. 8, 12, and 13 may also be employed.

A detailed explanation has been given of the specific examples of the two-dimensional image sensor which can be used in the present invention while referring to the drawings.

However, these examples are not exclusive. For example, in the received-light-voltage generating circuits indicated in Examples 1 through 5 (see FIGS. 8, 12, 13 and 14), an operational amplifier OP is used to detect the voltage on the source line. A transistor device may be substituted for the operational amplifier OP.

Figure 16:
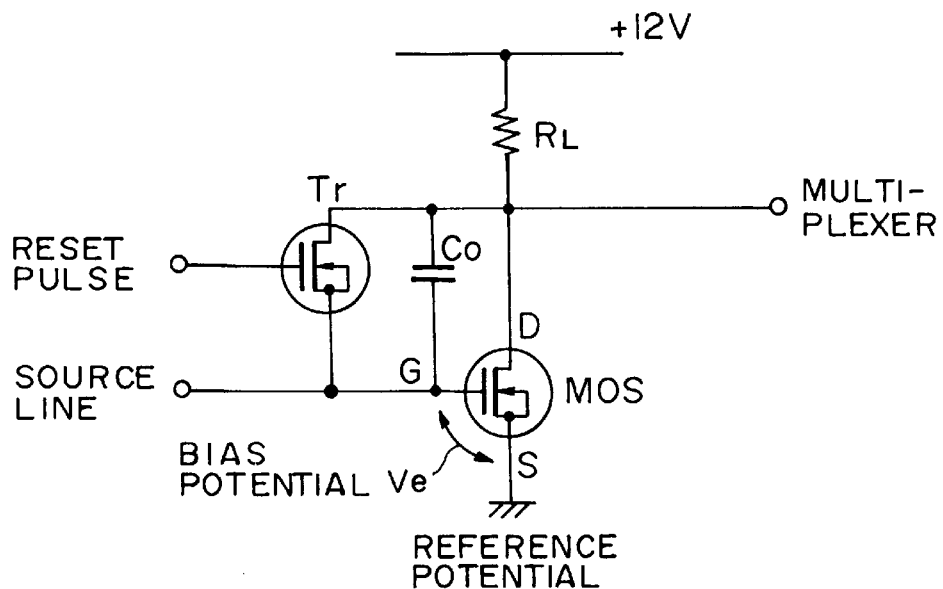
FIG. 16 is a circuit diagram illustrating an example of a received-light-voltage generating circuit using a transistor device.

FIG. 16 is a circuit diagram illustrating an example of the received-light-voltage generating circuit using a transistor in place of an operational amplifier OP employed in the circuit shown in FIG. 8. Referring to FIG. 16, the gate terminal of the transistor MOS is connected to a source line of the TFT sensor 2, while the source terminal of the transistor MOS is coupled to a reference potential (0[V]). Connected between the drain terminal and the gate terminal of the transistor MOS are a charge-absorbing capacitor Co and a reset switching device (transistor Tr) located in parallel to each other. In response to a reset pulse, the reset switching device connects the drain terminal and the gate terminal. The received-light-voltage generating circuit is operated basically in a manner similar to the circuit shown in FIG. 8, except that an offset voltage (bias potential Ve) equivalent to the transistor's source-gate voltage is added to the source line shown in FIG. 16.

Figure 17:
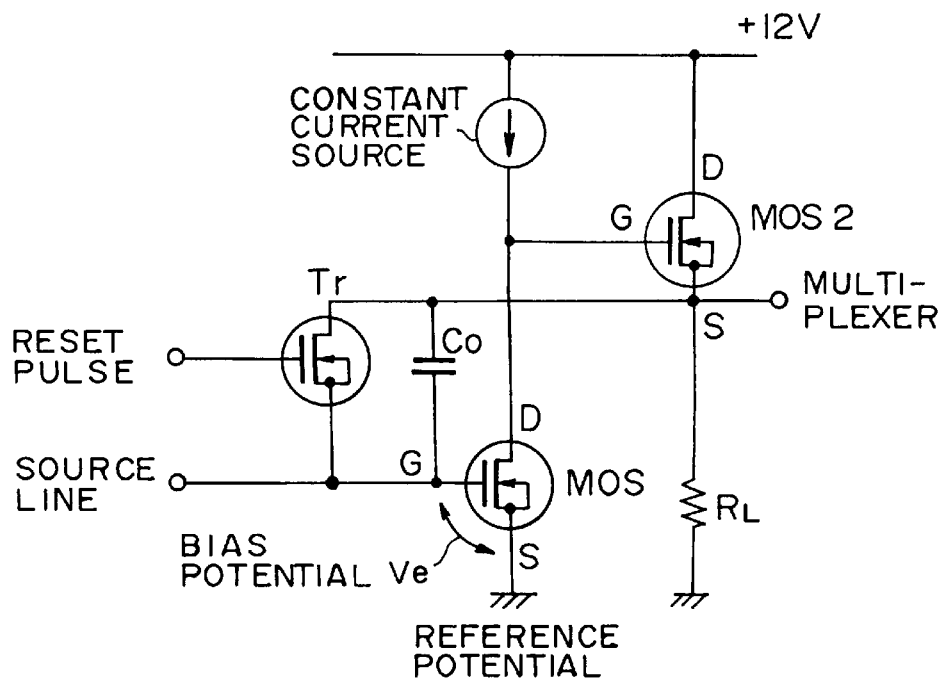
FIG. 17 is a circuit diagram illustrating another example of a received-light-voltage generating circuit using a transistor device.

FIG. 17 is a circuit diagram illustrating another example of the received-light-voltage generating circuit using a transistor device. The circuit shown in FIG. 17 is a modification made to the circuit illustrated in FIG. 16 in such a manner that the amplification factor is increased to detect even a slight voltage change in the source line and feed back this change, thereby inhibiting the overall voltage fluctuations on the source line.

In order to elevate the amplification factor, instead of the drain resistor RL shown in FIG. 16, a constant current source is connected to the drain terminal of the transistor MOS. Since the resistance of this constant current source can be viewed as substantially infinite, even a slight change in the drain current ID flowing in the transistor MOS causes a large voltage drop at the drain terminal of the transistor, as can be expressed by the following equation:

$$\Delta VD = \Delta ID \times RD$$

where $\Delta VD$ indicates a change in the drain voltage; $\Delta ID$ designates a change in the drain current; and RD represents the output resistance of the drain terminal (=the resistance of the constant current source→∞[Ω]).

The source follower circuit formed of a transistor MOS2 is inserted, as illustrated in FIG. 17, as a buffer circuit in order not to lower the amplification factor, which would otherwise be caused by a finite input resistance of the multiplexer disposed at the subsequent stage. Thanks to the source follower circuit, even though the drain current of the transistor MOS2 increases due to fluctuations in the input resistance of the multiplexer, the transistor's gate-source voltage VGS is hardly changed (i.e., the output resistance of the transistor MOS2 is small).

In the foregoing examples, the light-receiving units are arranged on the surface (upper surface) of the transparent substrate with which a subject is brought into contact. The units may be, however, disposed on the opposite surface (lower surface) of the substrate. In this case, the laminating order of layers to fabricate light-receiving units made of, for example, thin-film transistors, should be reversed, so that the units are located with their active layers near the surface of the substrate. This modification made to the arrangement of the light-receiving units makes it possible to protect various circuits for use in the light-receiving units and reading means from the exterior by virtue of the substrate, thereby improving the durability of the resulting image sensor. The image resolution is, on the other hand, impaired because the light-receiving units are placed away from a subject. To achieve high resolution, the light-receiving units are preferably located on the surface of the substrate with which a subject is directly brought into contact.

Fingerprint Reader

An explanation will now be given with reference to FIG. 18 of a fingerprint reader formed by application of the image reading apparatus in accordance with an embodiment of the present invention.

Figure 18:
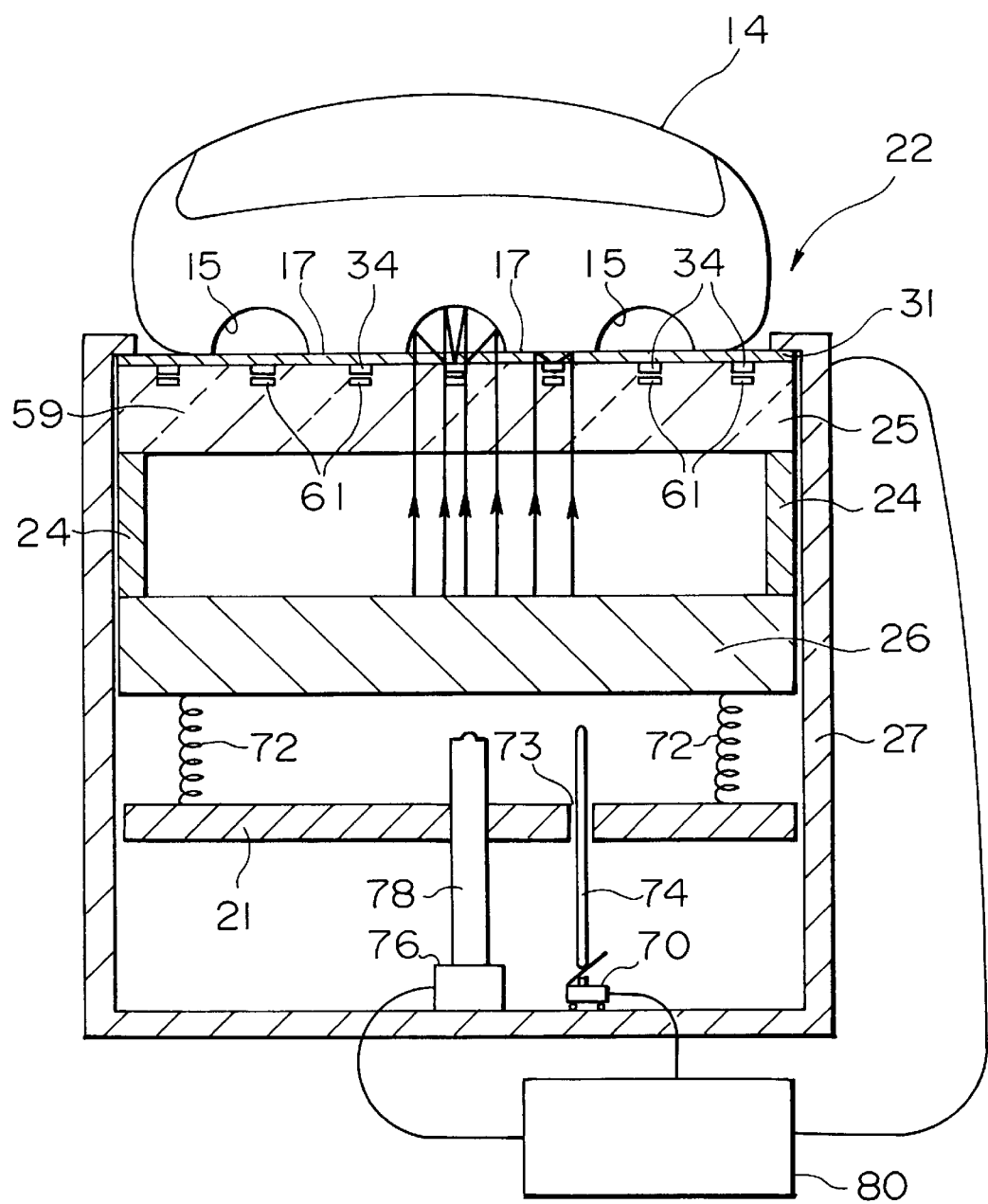
FIG. 18 is a sectional side elevation of a fingerprint reader according to an embodiment of the present invention.

Referring to FIG. 18, a fingerprint reader 22 is schematically constructed of a transparent substrate 59, a two-dimensional image sensor 25 formed of light-receiving units 34 and reading means provided on the substrate 59, and a light-emitting unit 26 disposed below the image sensor 25.

In the foregoing fingerprint reader 22, the image sensor 25 and the light-emitting unit 26 are integrated by means of an interconnecting member 24, all of the elements being held within a frame 27. A protective film 31 is deposited on the surface of the two-dimensional image sensor 25, while a light-shielding film 61 is formed below each light-receiving unit 34 to protect light emitted from the light-emitting unit 26 from directly striking the light-receiving unit 34. As the image sensor 25, any of the image sensors explained in the above-described examples may be used.

For use of this fingerprint reader 22, a finger 14 is, as shown in FIG. 18, pressed against the image sensor 25 to closely contact it, while the light-emitting unit 26 emits light to the finger 14. The light reflected on the surface of the finger 14 is then detected by the light-receiving units 34 of the image sensor 25. A fingerprint pattern is detectable due to a disparity in the intensity of the light reflected from the finger between depressions 15 and ridges 17 of the fingerprint. More specifically, it will now be assumed that the angle of the effective light to be incident on the light-receiving units 34 is predetermined to be 45 degrees. Then, the light emitted from the light-emitting unit 26 is deflected in a roundabout manner on the depressions 15 of the fingerprint, with the result being that a large amount of light impinges on the light-receiving units 34. In contrast, the light emitted from the light-emitting unit 26 is not deflected on the ridges 17, which are contacting the image sensor 25, but travels straight to the ridges 17, so that only a small amount of light strikes the light-receiving units 34. In this manner, the depressions 15 and the ridges 17 of the fingerprint can be differentiated according to the quantity of the light incident on the light-receiving units 34, and image information concerning the fingerprint is captured. It is particularly easy to distinguish the ridges 17 from the depressions 15 because the ridges 17 cover the light-receiving units 34.

In this embodiment, pressure-detecting means are further provided to detect pressure applied to the two-dimensional image sensor 25. In FIG. 18, the pressure-detecting means includes a base plate 21 which is disposed below the light-emitting unit 26 and is interconnected thereto via springs 72, a pressing bar 74 reciprocatably fit into a through-hole 73 which is formed in the base plate 21, and a switch 70 connected to the pressing bar 74.

The base plate 21 is adjustable to a desired position in the vertical direction from the bottom of the frame 27 by a screw 78 connected to a stepper motor 76. All of the two-dimensional image sensor 25, the switch 70, and the stepper motor 76 are connected to a controller 80, such as a computer.

In the aforedescribed fingerprint reader 22, in operation, upon bringing the finger 14 into contact with the image sensor 25, the light-emitting unit 26, which is interconnected to the sensor 25, is moved downward to contact the pressing bar 74 according to the pressing force applied by the finger 14. The bar 74 is further depressed to actuate the switch 70, indicating that the finger 14 is pressed against the fingerprint reader 22. The switch 70 then transmits a signal to the controller 80, which then sends a control signal to instruct the image sensor 25 to start reading the fingerprint. The light-emitting unit 26 may be connected to the controller 80, in which case, the light-emitting unit 26 can emit light immediately after the finger 14 is pressed on the image sensor 25.

In order to correctly read the fingerprint by the image sensor, it is important that a finger be pressed against the image sensor with a suitable pressing force. An excessive pressing force flattens the ridges of the fingerprint, thereby making it hard to distinguish the ridges from the depressions. It is, on the other hand, very difficult to generalize the pressing force of a finger among the individuals who have different degrees of skin hardness.

The fingerprint reader 22 of this embodiment, however, is capable of coping with the above drawbacks, which may be caused by an excessive or insufficient pressing force. For example, if the controller 80 receives information and determines that the image sensor 25 cannot correctly read the fingerprint due to, for example, flattened ridges, the controller 80 drives the stepper motor 76 to move the base plate 21 upward or downward, thereby adjusting and resetting the coefficient of elasticity of the springs 72. More specifically, if the ridges of the fingerprint are flattened due to an excessive pressing force or owing to soft finger skin, the base plate 21 is lifted to increase the coefficient of elasticity of the springs 72. In contrast, if a pressing force is too small or the finger skin is too hard, the base plate 21 is moved downward to decrease the coefficient of elasticity of the springs 72.

After the coefficient of elasticity of the springs 72 is reset, a warning is given to the user to re-press the finger against the fingerprint reader 22 by issuing a sound or giving an indication. An image of the fingerprint can thus be read once again.

In this manner, even though a correct fingerprint reading operation fails due to various reasons, such as the flattening of the ridges caused by a difference in the pressing force, such a failure can be detected to read the fingerprint once again. As a consequence, a correct fingerprint image can be stably achieved.

Moreover, the two-dimensional image sensor is desirably curved to match the shape of a finger. Namely, a flat surface of the image sensor incurs the following inconveniences. If the pressing force applied by a finger is insufficient, the area of contact between the finger and the surface of the sensor is small, thereby making it difficult to ensure an adequate fingerprint detecting region. If, on the other hand, the finger is pressed too hard on the image sensor in order to obtain a large contact area, the ridges of the fingerprint are flattened, which makes it hard to differentiate the ridges from the depressions.

Figure 19:
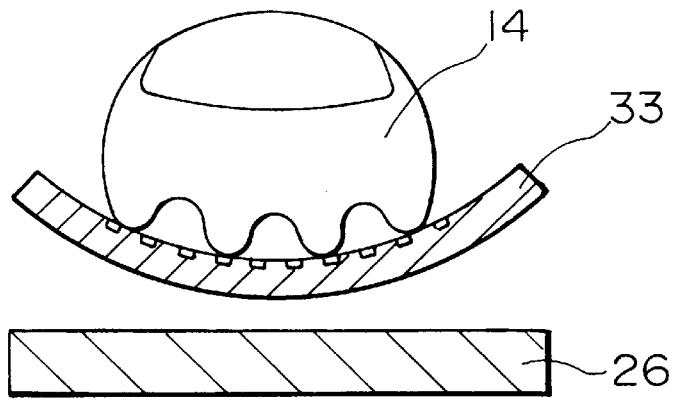
FIG. 19 is a sectional side elevation of an example of modifications made to the fingerprint reader shown in FIG. 18.

To overcome the above drawback, a two-dimensional image sensor is preferably curved, such as the one 33 illustrated in FIG. 19, with a hollowed center in a concave shape to match the contact surface of the finger 14. By virtue of this curved shape of the image sensor 33, a small pressing force is sufficient to guarantee a large fingerprint detecting region. The curved image sensor 33 can be fabricated by the following means: a flat-shaped image sensor is heat-treated to be curved; or light-receiving units are formed into flexible film, which are then laminated to a curved glass substrate.

Figure 20:
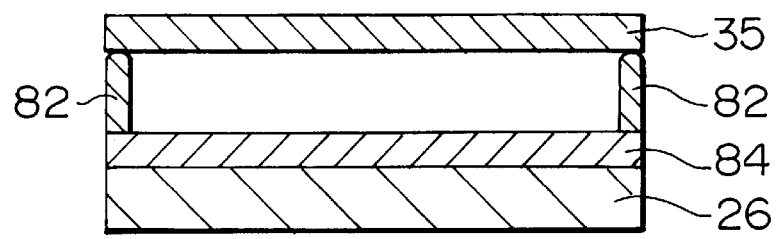
FIG. 20 is a sectional side elevation of another example of modifications made to the fingerprint reader shown in FIG. 18 when not in use.
Figure 21:
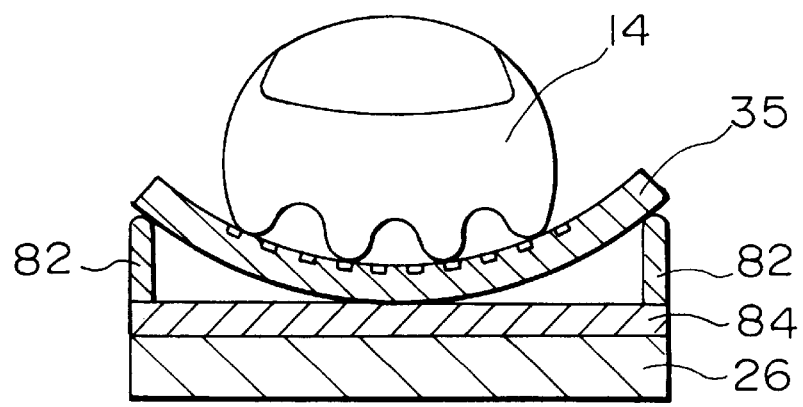
FIG. 21 is a sectional side elevation illustrating the fingerprint reader shown in FIG. 20 when in use.

More preferably, the aforedescribed image sensor 33 may be modified into an image sensor which can be deformed along the shape of a finger by responding to finger pressing. As this type of image sensor, the one 35 shown in FIGS. 20 and 21 may be considered. Referring to FIGS. 20 and 21, a flat-type support member 84 is provided between a two-dimensional image sensor 35 and a light-emitting unit 26, and a spacer 82 is further interjacent between the support member 84 and the image sensor 35. The image sensor 35 is formed using a flexible substrate made from, for example, polyethylene, and the spacer 82 is provided on the periphery of the image sensor 35, spacing being formed between the sensor 35 and the support member 84.

When not in use, the fingerprint reader using the above type of image sensor 35 is flat, as shown in FIG. 20. If, however, the finger 14 is pressed against the flexible image sensor 35, as illustrated in FIG. 21, the sensor 35 is curved along the contact surface of the finger 14.

In this modification shown in FIGS. 20 and 21, the support plate 84 formed of a rigid member is disposed under the spacer 82. The spacer 82 may be, however, directly provided on the light-emitting unit 26, which then, also serves as a support plate.

Figure 22:
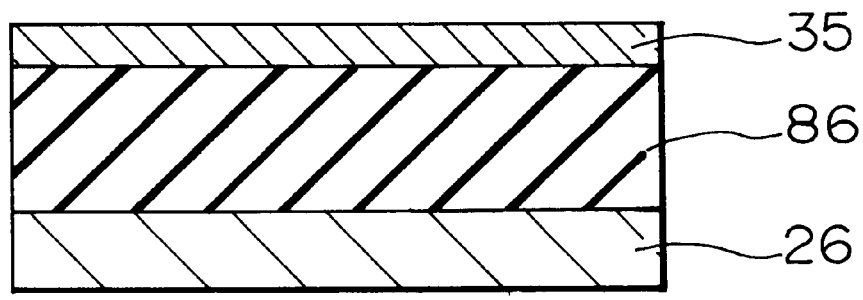
FIG. 22 is a sectional side elevation of a further example of modifications made to the fingerprint reader shown in FIG. 18 when not in use.
Figure 23:
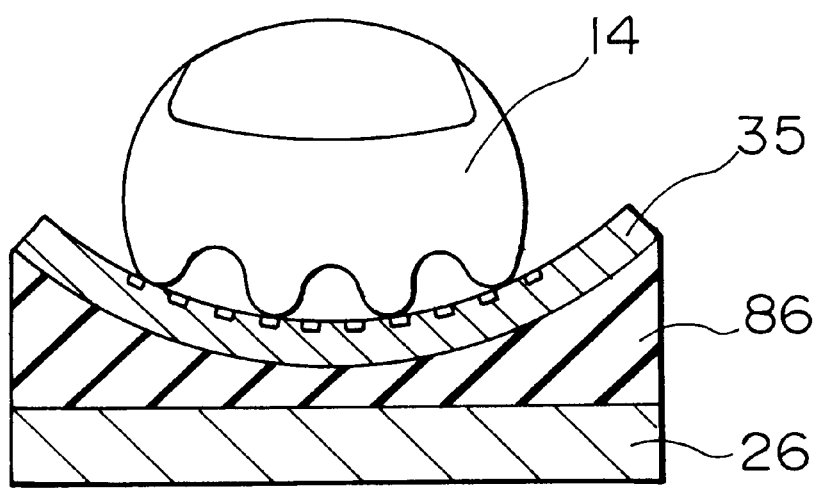
FIG. 23 is a sectional side elevation of the fingerprint reader shown in FIG. 22 when in use.

To further modify the foregoing fingerprint reader, a transparent elastic member 86, such as silicone rubber, may be suitably interposed, as illustrated in FIGS. 22 and 23, in place of the spacer, between the flexible image sensor 35 and the light-emitting unit 26. In this type of reader, when not in use, the image sensor 35 is flat, as shown in FIG. 22. When the finger 14 is pressed, however, the sensor 35 and the elastic member 86 are deformed to match the contact surface of the finger 14, as illustrated in FIG. 23.

Moreover, in order to improve the resolution of the image sensor by uniformly and thoroughly transmitting light from the light-emitting unit to a subject placed on the image sensor, deflection means for controlling the direction of light from the light-emitting unit are desirably provided between the image sensor and the light-emitting unit.

Figure 24:
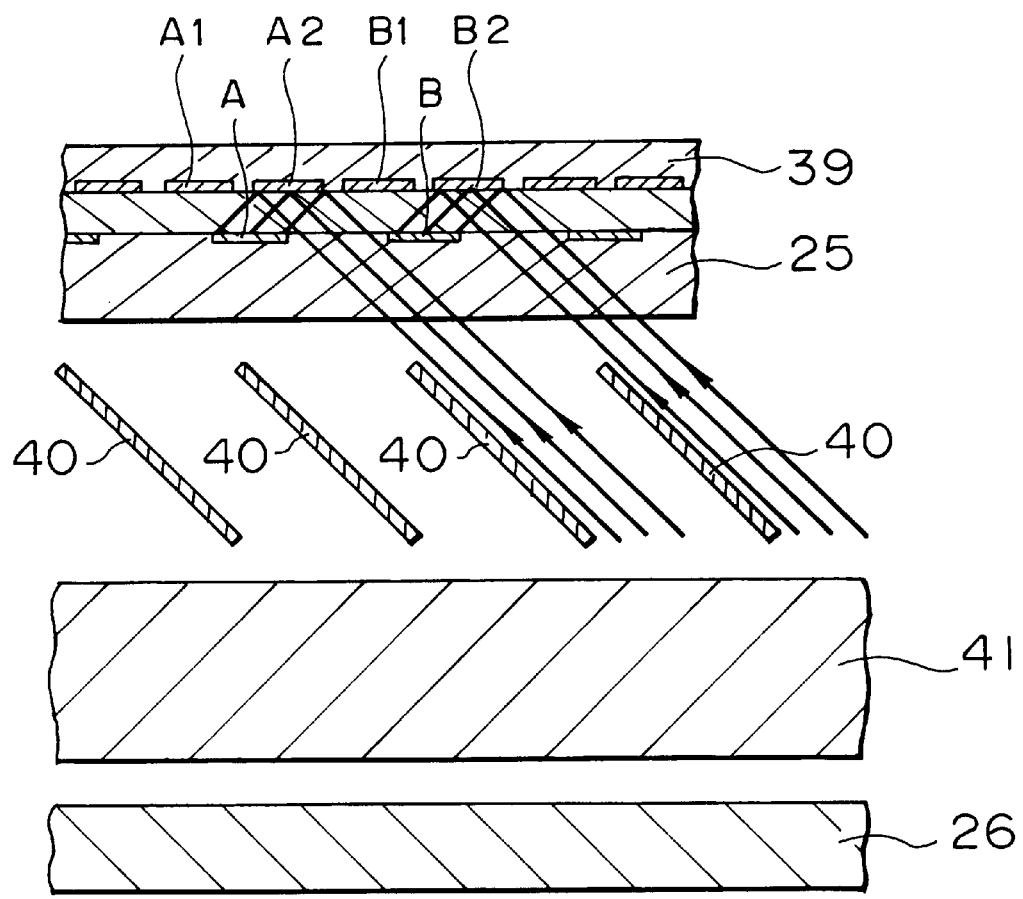
FIG. 24 is a sectional side elevation illustrating louvers used in a fingerprint reader.

As the deflection means, a louver, such as the one shown in FIG. 24, may be appropriately used. The louver, which is formed by a plurality of non-transparent thin sheets made of, for example, plastic film, located parallel to each other with intervals therebetween, is adapted to change its inclinations to a desired angle. In order to two-dimensionally control the direction of light output from the light-emitting unit, the deflection means has a first group of louvers 40 and a second louver 41, as shown in FIG. 24, the rotation axes of the first and second louvers 40 and 41 being perpendicular to each other in the same plane.

In the fingerprint reader provided with the above type of deflection means, a beam emitted from the light-emitting unit 26 changes its direction in the following manner. In the state in which the first group of louvers 40 are inclined to ascend from the right to the left, as illustrated in FIG. 24, the beam changes its direction to travel along the inclination of the second louver 41 and then the inclination of the first louvers 40, and finally reaches the subject 39, i.e., the finger, intimately contacting the image sensor 25. As a result, the light directed to the area A2 of the surface of the finger 39 is incident on the light-receiving unit A, while the light striking the area B2 of the surface of the finger 39 impinges on the light-receiving unit B, thereby obtaining image information concerning the areas A2 and B2 of the surface of the finger 39.

For simple representation, only part of the cross-sectional view of the subject 39 and the image sensor 25 is shown in FIG. 24. In practice, however, the subject 39 and the image sensor 25 are two-dimensionally extended in the plane, and in FIG. 24, image information to be read by the image sensor 25 corresponds to only one of the two areas divided from the contact area of the finger 39 in the checkered pattern.

Figure 25:
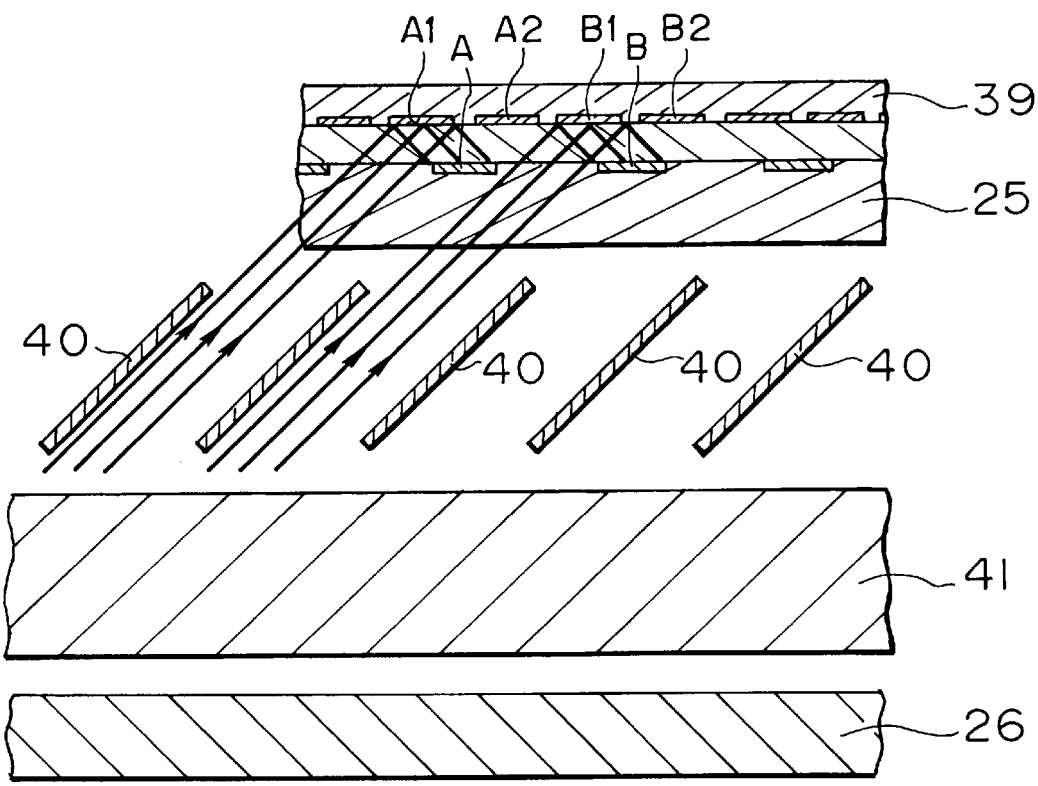
FIG. 25 is a sectional side elevation illustrating louvers used in a fingerprint reader.

Then, in the state in which the first group of louvers 40 are inclined to ascend from the left to the right, as shown in FIG. 25, the light emitted from the light-emitting unit 26 changes its direction to follow the inclination of the first louvers 40 and finally reaches the subject 39, which is contacting the image sensor 25. Thus, the light striking the area A1 of the surface of the subject 39 is incident on the light-receiving unit A, while the light directed to the area B of the surface of the subject 39 impinges on the light-receiving unit B. As a consequence, the image information representing the areas A1 and B1 of the surface of the subject 39 can be attained.

In a manner similar to the first group of louvers 40, the second louver 41 is capable of uniformly and thoroughly directing light to the subject 39 by adjusting its angle of inclination, thereby enabling the light-receiving unit to detect the light reflected from the subject 39 with high resolution.

As discussed above, even though the light-receiving units are not located right under a subject, image information concerning the contact area of the subject with the image sensor can be obtained by changing the direction of light emitted from the light-emitting unit. Additionally, thanks to the provision of the deflection means, the light-receiving units do not hinder the light output from the light-emitting unit from being directed to the subject which is contacting the image sensor 25. Hence, in the image reading apparatus of the present invention, although the light-receiving units are arranged away from the image-reading surface of the sensor, the light-receiving density can be enhanced by changing the direction of the light emitted from the light-emitting unit.

The deflection means is not restricted to the above-described louvers, and a lens array sheet, for example, may be used.

Figure 26:
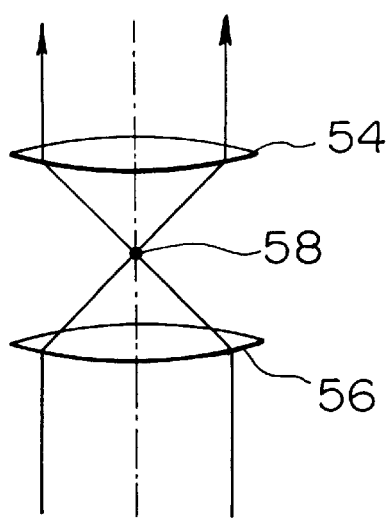
FIG. 26 is a schematic view illustrating a parallel ray generated by using lenses.
Figure 27:
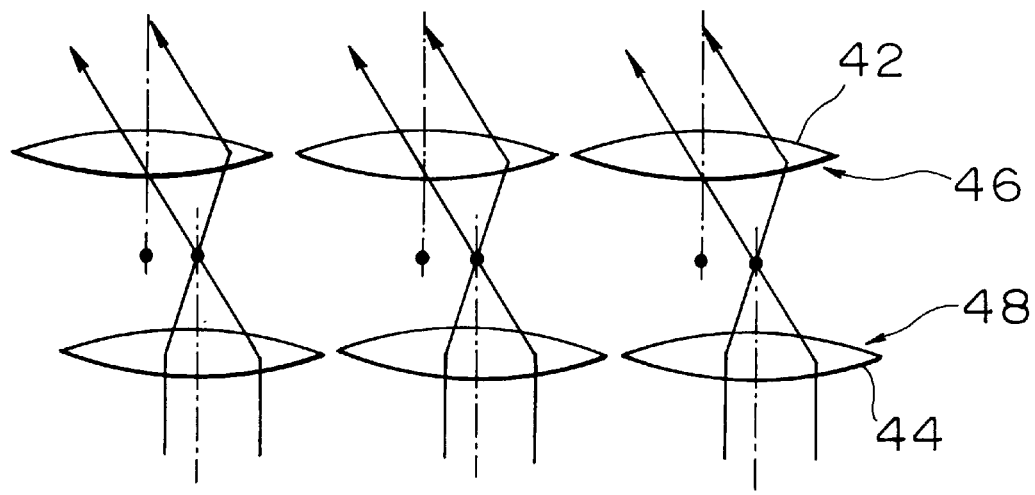
FIG. 27 is a schematic view illustrating the deflection of light caused by lens array sheets.
Figure 28:
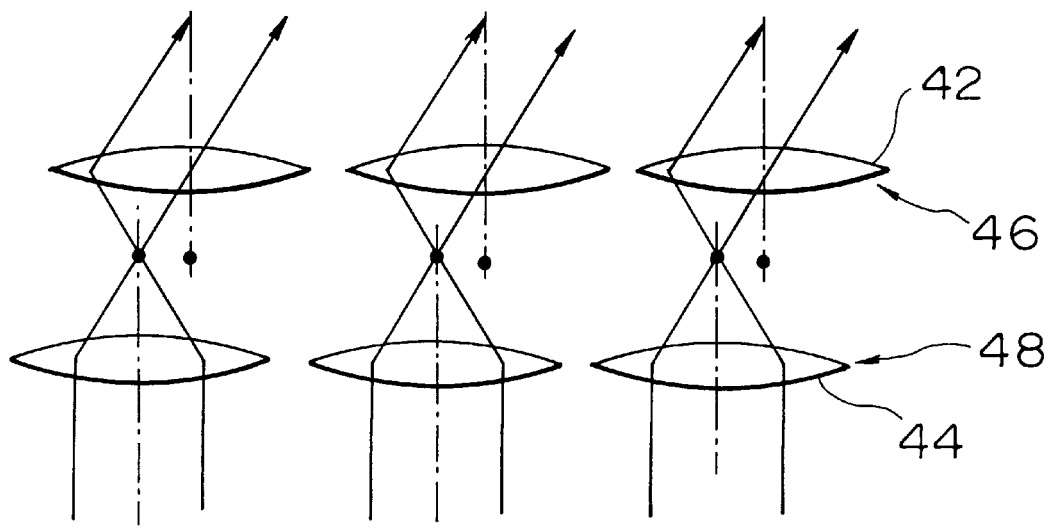
FIG. 28 is a schematic view illustrating the deflection of light caused by lens array sheets.

More specifically, two lenses 54 and 56 are arranged, as shown in FIG. 26, in such a manner that the focal points 58 of the two lenses 54 and 56 match each other. A parallel ray incident on one lens 56 emits from the other lens 54 without changing its traveling direction. If however, a pair of lenses, i.e., a first lens 42 and a second lens 44, are relatively displaced, as shown in FIG. 27, from each other while the interval therebetween is maintained, a parallel ray impinging on the second lens 44 changes its angle of inclination and emits from the first lens 42. Accordingly, by the use of first and second lens-array sheets 46 and 48, each integrally formed by a plurality of lenses, a ray incident on the second lens-array sheet 48 changes its traveling direction, as illustrated in FIG. 27, to the inclination ascending from the right to the left, and emits from the first lens-array sheet 46. Similarly, the second lens-array sheet 48 is displaced, as illustrated in FIG. 28, relative to the first lens-array sheet 46 in the direction opposite to the displacement shown in FIG. 27, so that a parallel ray output from the first lens-array sheet 46 changes its angle of inclination in the opposite direction to the angle shown in FIG. 27 and emits from the second lens-array sheet 48.

In this manner, by utilizing the lens array sheets, a parallel ray can be changed to an inclined ray with a desirable angle of inclination, thereby adjusting the direction of light to be incident on a subject. It is thus possible to uniformly and thoroughly irradiate a subject, such as a fingerprint, with a ray, as in the case with the use of the above-described louvers, thereby contributing to the improved resolution.

The image reading apparatus of the present invention is applicable not only to the fingerprint reader, but also to an apparatus for reading, for example, palm lines, by bringing a whole hand into a contact with the two-dimensional image sensor.

Image Scanner

Figure 29:
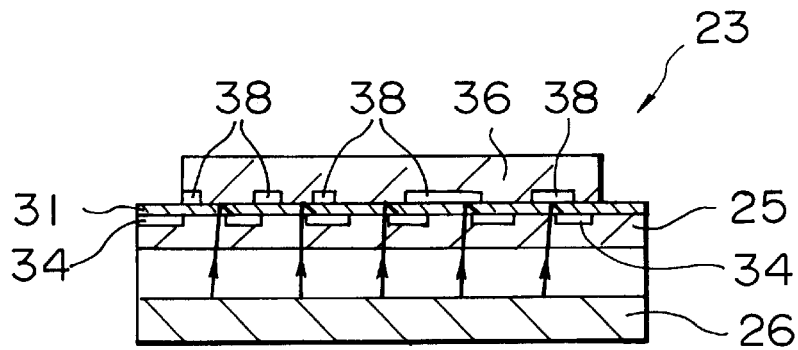
FIG. 29 is a sectional side elevation illustrating an example of an image scanner.

The aforedescribed image reading apparatus of the present invention can also be used as an image scanner. For example, an image scanner 23 having a light-emitting unit 26 and a two-dimensional image scanner 25 disposed above the unit 26 is, as illustrated in FIG. 29, operable in the following manner. A subject 36, for example, a sheet of paper on which various images 38, such as characters and graphics, are formed, is intimately placed on the surface of a protective film 31 formed on the image sensor 25. Then, a ray output from the light-emitting unit 26 in an upward direction strikes the surface of the subject 36 through an illumination window array disposed in the image sensor 25, and the light reflected from the surface of the subject 36, i.e., the sheet of paper, reaches the light-receiving units 34 formed in the image sensor 25. There is a disparity in the intensity of the light reflected from the sheet of paper between the portions with and without the images 38. Accordingly, the image sensor 25 senses the reflected light with a non-uniform light intensity corresponding to the different portions of the paper 36. The light-receiving units 34, which are arranged in a matrix, are thus able to determine the configuration of the images, such as characters and graphics, formed on the surface of the paper 36.

Hence, the image scanner of the present invention can find widespread use in copying machines or image readers, which read images formed on printed articles and inputs them into a computer.

A conventional type of image scanner using a CCD, which requires a reducing optical system, cannot be reduced to a thinner thickness than a sheet of paper to be read by the scanner. The above type of image scanner, which does not require a reducing optical system, can thus be miniaturized and made thinner.

Moreover, this image scanner is able to ensure a larger light-receiving area with a smaller loss of light than a CCD camera because a subject can be intimately brought into contact with the light-receiving units. Accordingly, the light reflected from the subject with a greater intensity can be obtained, thereby enhancing photoelectric conversion sensitivity. This further increases the storage capacity of the image sensor and reduces pulsating noise contained in a gate driving pulse, thereby suppressing the entry of noise to a picture to be displayed (i.e., achieving a high signal-to-noise (SN) ratio).

Further, if a video camera is used to take photographs, the following inconveniences are encountered: a camera and a large illumination stand are required, a CCD camera is difficult to install near a personal computer due to the glaring of illumination light, and an illumination light, such as a ceiling fluorescent lamp, is projected onto a subject. In the aforedescribed image scanner, however, the light emitted from the light-emitting unit strikes a subject that is contacting the image sensor through an illumination window array located in the sensor. This eliminates the need for an extra illumination light which should be separately installed for a CCD camera. It is also possible to prevent leakage of the illumination light from within the image scanner to the exterior. As a result, the user's eyes can be protected from a glaring illumination light, and be free from the influence of external light.

Figure 30:
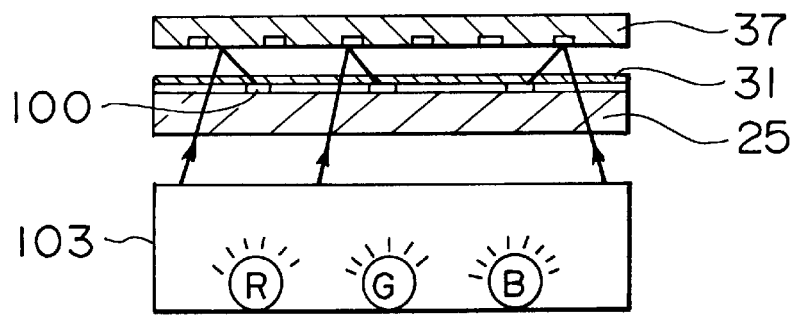
FIG. 30 is a sectional side elevation illustrating an example of an image scanner into which color image information is input.

Moreover, the foregoing image scanner may detect multicolor image information by using a light-emitting unit which emits a plurality of colors. For example, as shown in FIG. 30, rays of light indicating three colors, i.e., red (R), green (G), and blue (B), are sequentially emitted from a light-emitting unit, i.e., an RGB switching illumination 101, and applied to the surface of a subject 37, such as a sheet of paper on which a multi-color image is printed. The rays of light are further reflected from the subject 37 and reach a TFT sensor 103. The intensity of the light corresponding to the respective colors is then detected and calculated in the TFT sensor 103, thereby obtaining information concerning the image formed on the paper.

According to the above method, an expensive color filter, such as the one used in a CCD camera, is unnecessary, and it is possible to achieve a resolution three times as high as a CCD camera, which requires three RGB cells to obtain one pixel forming an image. Further, by using the aforedescribed two-dimensional image sensor, the stored optical charges are wholly read to the received-light-voltage generating circuits. Accordingly, in a multi-color reading operation, the rays of light indicating three RGB colors can be instantaneously switched without generating after-image.

Area Scanner

Figure 31:
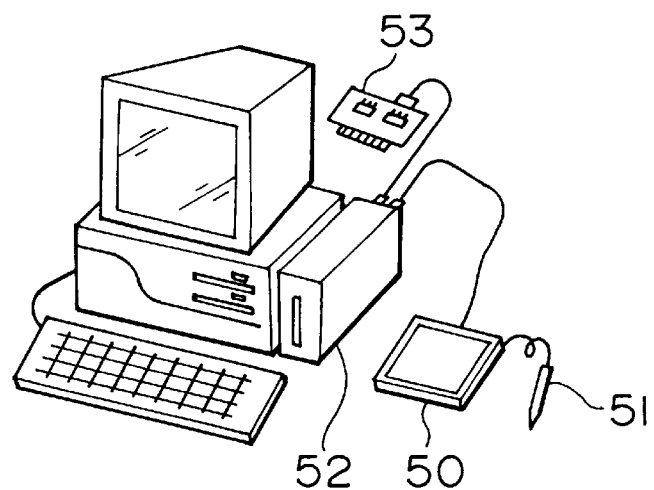
FIG. 31 illustrates an example of an area scanner used as a peripheral unit connected to a personal computer.
Figure 32:
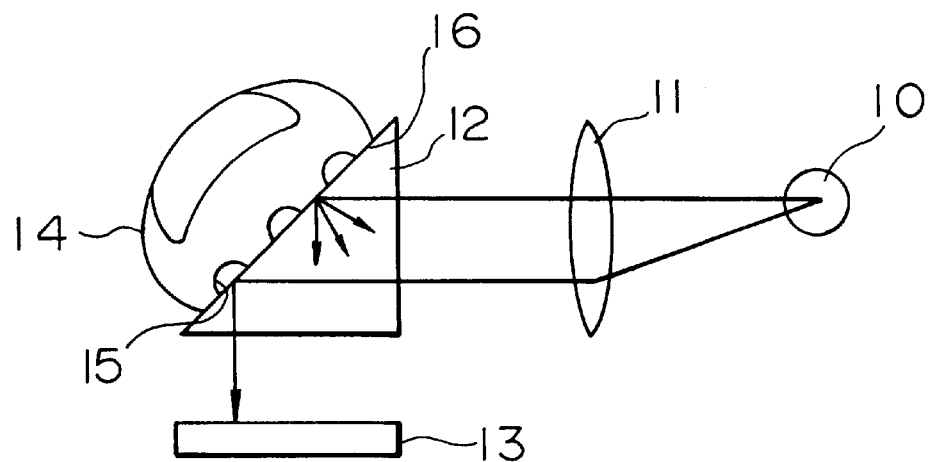
FIG. 32 is a schematic view illustrating an example of conventional fingerprint readers.
Figure 33:
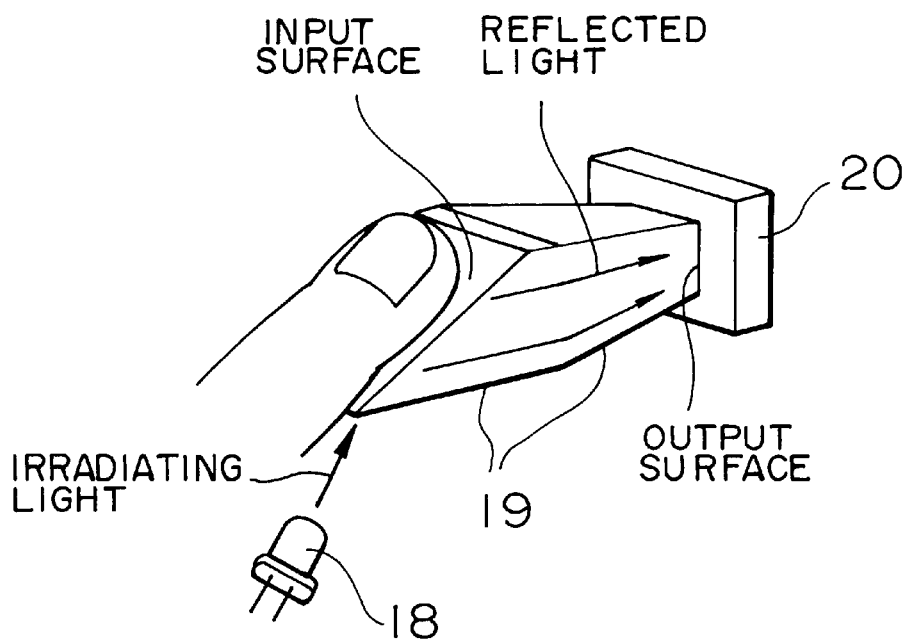
FIG. 33 is a schematic view illustrating an example of conventional fingerprint readers.
Figure 34:
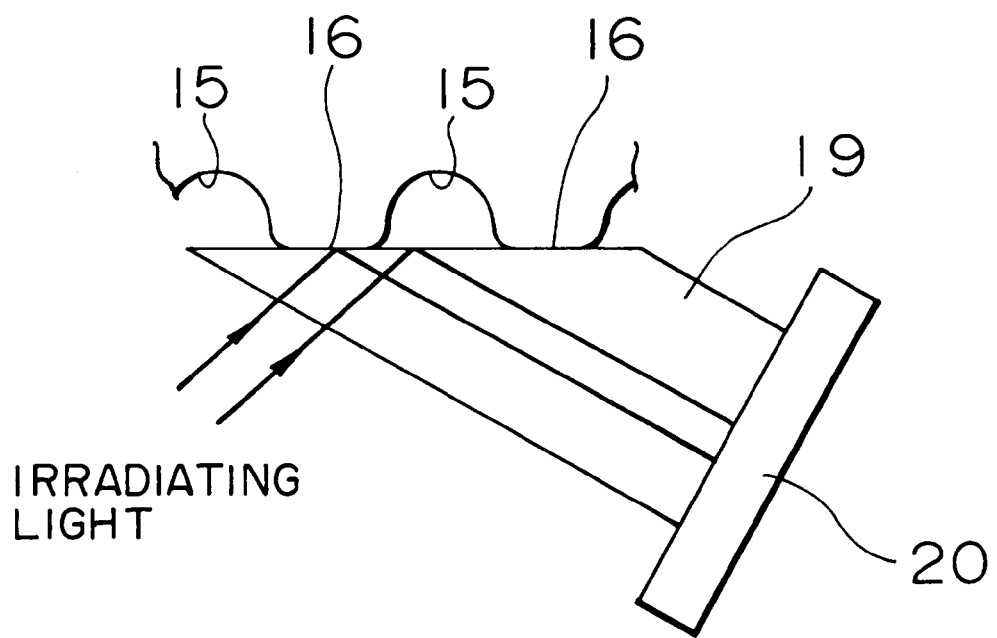
FIG. 34 is a schematic view illustrating an example of conventional fingerprint readers.

To further develop the present invention, the image reading apparatus is also applicable to an area scanner, for example, as one of the peripheral units connected to a computer, as illustrated in FIG. 31.

In an area scanner 50 shown in FIG. 31, the contact surface of the two-dimensional image sensor is traced by moving any operating unit, for example, a finger, as a subject. Thus, the positions of the surface designated by the finger are sequentially sensed according to a difference in the intensity of light received by the image sensor, thereby detecting the movement of the finger. The area scanner 50 is thus able to serve as an operating unit of a computer, i.e., as an alternative to a mouse.

If this area scanner 50 is used in a bright environment, the use of a light-emitting device is not essential, and a reflector, such as a mirror, can be sufficiently used as the light-emitting unit. In this case, ambient light enters the area scanner 50 through the portions other than the position on which the finger is placed, and is further reflected by the reflector. Then, the light intensity with a non-uniform distribution representing whether or not the finger is placed on the area scanner 50 is detected by the different light-receiving units. Hence, an extremely power-thrifty area scanner can be realized.

As an alternative to a finger, a pen-type operation unit having a reflector on its tip end may be used to trace the contact surface of the area scanner. Then, only the light-receiving units corresponding to the positions designated by the operation unit can detect bright light, thereby detecting the movement of the operation unit.

Alternatively, a writing pen 51 having a light-emitting portion at its tip end may be used as the operation unit, as shown in FIG. 31, and the light-emitting units can detect light output from the writing pen 51 without needing to provide a light-emitting unit within the area scanner 50.

This enables the area scanner 50 to detect the movement of the writing pen 51.

In FIG. 31, a peripheral unit (an external hard disk, a magneto-optical disk, or a CD-ROM) 52 connected to the area scanner 51 is further connected to a personal computer via a small computer systems interface (SCSI) board 53. In this manner, an interface, such as a SCSI, is best used to connect peripheral units, including an area scanner, to a personal computer.

As is seen from the foregoing description, the image reading apparatus of the present invention offers the following advantages.

Optical system parts, such as lenses and prisms, are not necessarily required for the image reading apparatus, thereby making it possible to achieve an inexpensive, more miniaturized and thinner image reading apparatus with higher resolution. Such advantages are particularly exhibited by using semiconductor-made and photoconductive thin-film transistors having active layers as light-receiving units.

Hence, by application of the image reading apparatus of the present invention, a fingerprint reader, an image scanner, and an area scanner, all of which are inexpensive, thinner and downsized, can be implemented. In particular, the image reading apparatus can be integrated into input means, for example, a keyboard, of a computer, thereby attaining a simple and reliable fingerprint reader for identifying individuals, i.e., the users.

Further, light-receiving units may be provided on the same surface of a substrate as the surface on which a subject is placed, thereby also enhancing the resolution.

Moreover, received-light-voltage generating circuits, which generate received-light voltages in accordance with the amount of electric charge stored in the light-receiving units, and image-signal reading means, which outputs an image signal in response to the received-light voltage, are disposed within the reading means. Accordingly, it is possible to substantially maintain the level of the output signals, improve the quality of a picture representing the read image, and achieve noise reduction and high-speed reading.

Additionally, rays of light designating a plurality of different colors may be applied to a subject, thereby enabling color-image reading.

What is claimed is:

1. An image reading apparatus containing light receiving transistors and switching transistors comprising:

a transparent substrate;

a light-emitting unit for emitting light to pass through said transparent substrate and to be applied to at least one subject pressed against said transparent substrate;

a plurality of received-light thin-film transistors having active layers composed of photoconductive semiconductors, said received-light thin-film transistors spaced apart in the vertical and horizontal directions in said transparent substrate at a surface of said transparent substrate to which said at least one subject is pressed, said received-light thin-film transistors receiving light emitted from said light emitting member and deflected from said at least one subject, and wherein said received-light thin-film transistors generate an electrical signal corresponding to the amount of said light received from said light deflected from said at least one subject;

switching thin-film transistors arranged at said surface of said transparent substrate having said received-light thin-film transistors arranged therein in correspondence with each of said received-light thin-film transistors so as to control an output of each of said received-light thin-film transistors;

reading mechanism operational to read an image of said at least one subject, wherein said reading mechanism includes a received-light-voltage generating circuit operational to generate a received-light-voltage for each of said received-light thin-film transistors corresponding to the amount of said electrical signal generated by each of said received-light thin-film transistors; and an image signal outputting mechanism operational to output an image signal in response to a received-light-voltage generated by said received-light-voltage generating circuit.

2. An image reading apparatus containing light receiving transistors and switching transistors according to claim 1, wherein said light-emitting unit comprises a light-emitting unit for emitting rays of light representing a plurality of different colors.

3. An image reading apparatus containing light receiving transistors and switching transistors according to claim 1, wherein said received-light-voltage generating circuit is comprised of an operation amplifier having two input terminals and one output terminal, one of said input terminals being connected to an output side of said switching thin-film transistor and the other input terminal connected to a reference potential; an electrical load absorbing capacitor connected between said one input terminal of said operation amplifier and said output terminal of said operation amplifier; and a resetting transistor having a control electrode to which a reset signal for resetting an electrical load of said capacitor is inputted and input/output electrodes for resetting an electrical load of said capacitor.

4. An image reading apparatus containing light receiving transistors and switching transistors according to claim 3, wherein a resistor element for dampening an action of parasitic capacitance of said resetting transistor is connected between an input electrode of said resetting transistor and a reference potential.

5. An image reading apparatus containing light receiving transistors and switching transistors according to claim 1, wherein said received-light-voltage generating circuit is comprised of an operation amplifier having two input terminals and one output terminal, one of said input terminals being connected to an output side of said switching thin-film transistor and the other input terminal connected to a reference potential; a series-connected resistor circuit connected between said output terminal of said operation amplifier and said reference potential; an electrical load absorbing capacitor connected between a mid-point of said series-connected resistor circuit and said one input terminal of the operation amplifier; and a resetting transistor having a control electrode to which a reset signal for resetting an electrical load of said capacitor is inputted and input/output electrodes for resetting an electrical load of said capacitor.

6. An image reading apparatus containing light receiving transistors and switching transistors according to claim 1, wherein said received-light-voltage generating circuit is comprised of an operation amplifier having two input terminals and one output terminal, one of said input terminals being connected to an output side of said switching thin-film transistor and the other input terminal connected to a reference potential; an electrical load absorbing capacitor connected between said one input terminal of said operation amplifier and said output terminal of said operation amplifier; a comparator having two input terminals and one output terminal, one of said input terminals connected to an output side of said operation amplifier and the other input terminal connected to said reference potential; and a resetting transistor having a control electrode to which a reset signal for resetting an electrical load of said capacitor is inputted and input/output electrodes for resetting an electrical load of said capacitor, and one of said input/output electrodes being connected to an output terminal of said comparator and the other electrode being connected to said one input terminal.

7. An image reading apparatus containing light receiving transistors and switching transistors according to claim 1, wherein said received-light-voltage generating circuit is comprised of a MOS transistor having its gate electrode connected to an output side of said switching thin-film transistor, one of its source electrode and its drain electrode being connected to a reference potential and the other electrode being applied as an output electrode; an electrical load absorbing capacitor connected between said gate electrode of said MOS transistor and said output electrode; and a resetting transistor having a control electrode to which a reset signal for resetting an electrical load of said capacitor is inputted and input/output electrodes for resetting an electrical load of said capacitor.

8. An image reading apparatus containing light receiving transistors and switching transistors according to claim 7, wherein a source of constant current is connected to the output electrode of said MOS transistor.

9. An image reading apparatus containing light receiving transistors and switching transistors according to claim 1, wherein said image signal outputting means is a multiplexer for selectively changing-over signals outputted from a plurality of said received-light-voltage generating circuits and outputting them.

10. An image reading apparatus containing light receiving transistors and switching transistors according to claim 1, wherein said received-light thin-film transistor has a gate electrode, a gate insulating film, said semiconductor active layer, a drain electrode and a source electrode, and a light shielding electrode placed between said semiconductor active layer and said transparent substrate and electrically spaced apart from said gate electrode so as to prevent a direct light emitted from said light emitting member from being incident to said semiconductor active layer in cooperation with said gate electrode.

11. An image reading apparatus containing light receiving transistors and switching transistors comprising:

a transparent substrate;

a light emitting member for emitting light passing through said transparent substrate and radiating to the subjects pressed against said transparent substrate;

a plurality of received-light thin-film transistors having active layers composed of photoconductive semiconductors spaced apart in horizontal and vertical directions in said transparent substrate at a surface of said transparent substrate to which the subjects are pressed, receiving a reflected light of light emitted from said light emitting member and radiated against said subjects, and generating an electrical load in response to an amount of received light of said reflected light;

switching thin-film transistors arranged at a surface of said transparent substrate having said received-light thin-film transistors arranged therein in correspondence with each of said received-light thin-film transistors so as to control an output of each of said received-light thin-film transistor;

a reading means for reading the image of the subjects in response to an amount of received light of said received-light thin-film transistors; and wherein said reading means includes a received-light-voltage generating circuit for generating a received-light-voltage for each of said received-light thin-film transistors in response to an amount of electrical load generated by said received-light thin-film transistors; and an image signal outputting means for outputting an image signal in response to a received-light-voltage generated by said received-light-voltage generating circuit, and the surface of said transparent substrate against which the subjects are pressed can be moved up and down.

12. An image reading apparatus containing light receiving transistors and switching transistors according to claim 11, wherein means for moving up or down the surface of said transparent substrate against which the subjects are pressed is comprised of a base bottom plate and a resilient means for supporting said light emitting member in such a way that it may be moved up or down in respect to said substrate.

* * * * *